(12) United States Patent
Liu et al.

(10) Patent No.: US 10,444,820 B2
(45) Date of Patent: Oct. 15, 2019

(54) LOW POWER TOUCH DETECTION

(71) Applicant: Apple Inc., Cupertino, CA (US)

(72) Inventors: Zhao Liu, Santa Clara, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/701,223

(22) Filed: Sep. 11, 2017

(65) Prior Publication Data

US 2019/0079576 A1   Mar. 14, 2019

(51) Int. Cl.
| | |
|---|---|
| *G06F 1/3234* | (2019.01) |
| *G06F 3/041* | (2006.01) |
| *G06F 1/3206* | (2019.01) |
| *G06F 3/044* | (2006.01) |

(52) U.S. Cl.
CPC ......... *G06F 1/3262* (2013.01); *G06F 1/3206* (2013.01); *G06F 3/044* (2013.01); *G06F 3/0416* (2013.01); *G06F 3/0412* (2013.01)

(58) Field of Classification Search
CPC ...... G06F 1/3262; G06F 3/044; G06F 1/3206; G06F 3/0412; G06F 3/0416
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |

(Continued)

FOREIGN PATENT DOCUMENTS

| | | |
|---|---|---|
| EP | 2 741 184 A2 | 6/2014 |
| JP | 2000-163031 A | 6/2000 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Aneeta Yodichkas
(74) *Attorney, Agent, or Firm* — Kubota & Basol LLP

(57) ABSTRACT

Low-power touch detection can be beneficial for an electronic device to maintain touch detection and enable response to certain touch inputs in a low-power state (e.g., a sleep state), while consuming less power than touch detection during an awake state. For example, sensing touch during the sleep state can allow the electronic device to wake (e.g., transition from the sleep state to the awake state) in response to detecting a certain touch input (e.g., a tap or other touch input) on its touch screen while in the sleep state. Examples of the disclosure provide various ways for the electronic device to further reduce power consumption in the low-power state by simplifying the processing requirements for touch input to the touch-sensitive surface.

36 Claims, 16 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,375,535 B1 | 5/2008 | Kutz et al. |
| 7,663,607 B2 | 2/2010 | Hotelling et al. |
| 8,479,122 B2 | 7/2013 | Hotelling et al. |
| 9,001,072 B2 | 4/2015 | Sobel et al. |
| 9,395,859 B1 | 7/2016 | Yate et al. |
| 2006/0197753 A1 | 9/2006 | Hotelling |
| 2011/0157068 A1 | 6/2011 | Parker et al. |
| 2012/0062482 A1 | 3/2012 | Ding et al. |
| 2013/0207913 A1* | 8/2013 | Takashima ............ G06F 3/044 345/173 |
| 2015/0234446 A1 | 8/2015 | Nathan et al. |
| 2016/0152102 A1 | 6/2016 | Shahparnia et al. |
| 2016/0162102 A1 | 6/2016 | Shahparnia et al. |
| 2018/0088733 A1 | 3/2018 | Syed |

FOREIGN PATENT DOCUMENTS

| | | |
|---|---|---|
| JP | 2002-342033 A | 11/2002 |
| KR | 10-2011-0133853 A | 12/2011 |
| KR | 10-2014-0072804 A | 6/2014 |

OTHER PUBLICATIONS

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

LOW POWER TOUCH DETECTION

FIELD OF THE DISCLOSURE

This relates generally to touch input processing for touch-sensitive devices, and more particularly, to detecting touch input on a touch-sensitive device in a low-power state.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

Touch sensor panels can include an array of touch sensors capable of detecting touches (the touching by an object such as a finger upon a touch-sensitive surface). Some touch sensor panels are able to detect multiple touches (e.g., the touching of multiple fingers upon a touch-sensitive surface at distinct locations at or about the same time) and near touches (e.g., fingers within the near-field detection capabilities of their touch sensors), and identify and track their locations.

SUMMARY OF THE DISCLOSURE

This relates to systems and methods for detecting touch input on a touch-sensitive surface in a low-power state (e.g., a sleep state). Low-power touch detection can be beneficial for an electronic device to maintain touch detection and enable response to certain touch inputs in a sleep state, while consuming less power than touch detection during an awake state. For example, sensing touch during the sleep state can allow the electronic device to wake (e.g., transition from the sleep state to the awake state) in response to detecting a certain touch input (e.g., a tap or other touch input) on its touch screen while in the sleep state. Examples of the disclosure provide various ways for the electronic device to further reduce power consumption in the low-power state by simplifying the processing requirements for touch input to the touch-sensitive surface.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods for detecting touch input on a touch-sensitive surface in a low-power state (e.g., a sleep state). Low-power touch detection can be beneficial for an electronic device to maintain touch detection and enable response to certain touch inputs in a sleep state, while consuming less power than touch detection during an awake state. For example, sensing touch during the sleep state can allow the electronic device to wake (e.g., transition from the sleep state to the awake state) in response to detecting a certain touch input (e.g., a tap or other touch input) on its touch screen while in the sleep state. Examples of the disclosure provide various ways for the electronic device to further reduce power consumption in the low-power state by simplifying the processing requirements for touch input to the touch-sensitive surface.

Figure 1A:
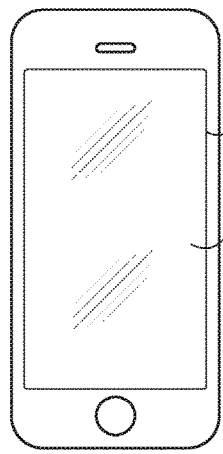
FIGS. 1A-1E illustrate exemplary systems with touch screens that can perform input processing according to examples of the disclosure.
Figure 1B:
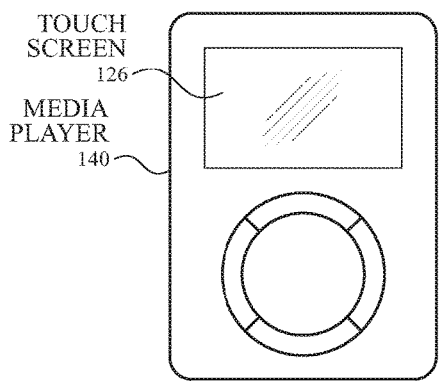
Figure 1C:
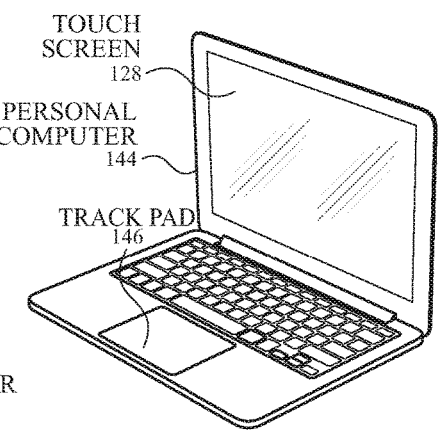
Figure 1D:
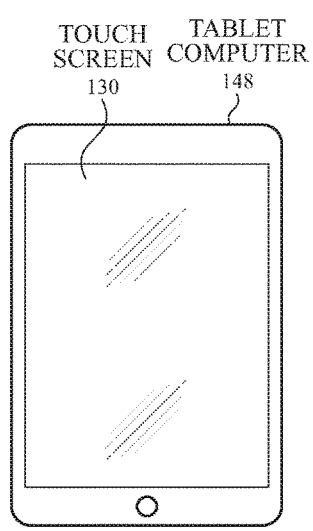
Figure 1E:
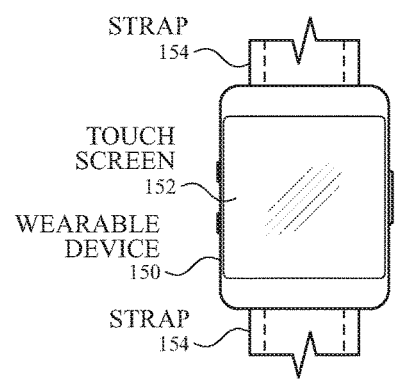

FIGS. 1A-1E illustrate exemplary systems with touch screens that can perform input processing according to examples of the disclosure. As described in more detail herein, the input processing can include a low-power touch detection algorithm for use in a low-power state. FIG. 1A illustrates an exemplary mobile telephone 136 that includes a touch screen 124 and can perform input processing according to examples of the disclosure. FIG. 1B illustrates an example digital media player 140 that includes a touch screen 126 and can perform input processing according to examples of the disclosure. FIG. 1C illustrates an example personal computer 144 that includes a touch screen 128 and a track pad 146 and can perform input processing according to examples of the disclosure (on inputs detected from the touchscreen 128 or track pad 146). FIG. 1D illustrates an example tablet computing device 148 that includes a touch screen 130 and can perform input processing according to examples of the disclosure. FIG. 1E illustrates an example wearable device 150 (e.g., a watch) that includes a touch screen 152 and can perform input processing according to examples of the disclosure. Wearable device 150 can be coupled to a user via strap 154 or any other suitable fastener. It should be understood that the example devices illustrated in FIGS. 1A-1E are provided by way of example, and other types of devices can perform input processing according to examples of the disclosure. Additionally, although the devices illustrated in FIGS. 1A-1E include touch screens, in some examples, input processing according to examples of the disclosure can be performed for touch sensor panels without a display (e.g., track pad 146). In some examples, touch screens 124, 126, 128, 130 and 152 can be based on self-capacitance and/or mutual capacitance. In some examples, a touch screen can be multi-touch, single touch, projection scan, full-imaging multi-touch, capacitive touch, etc.

Figure 2:
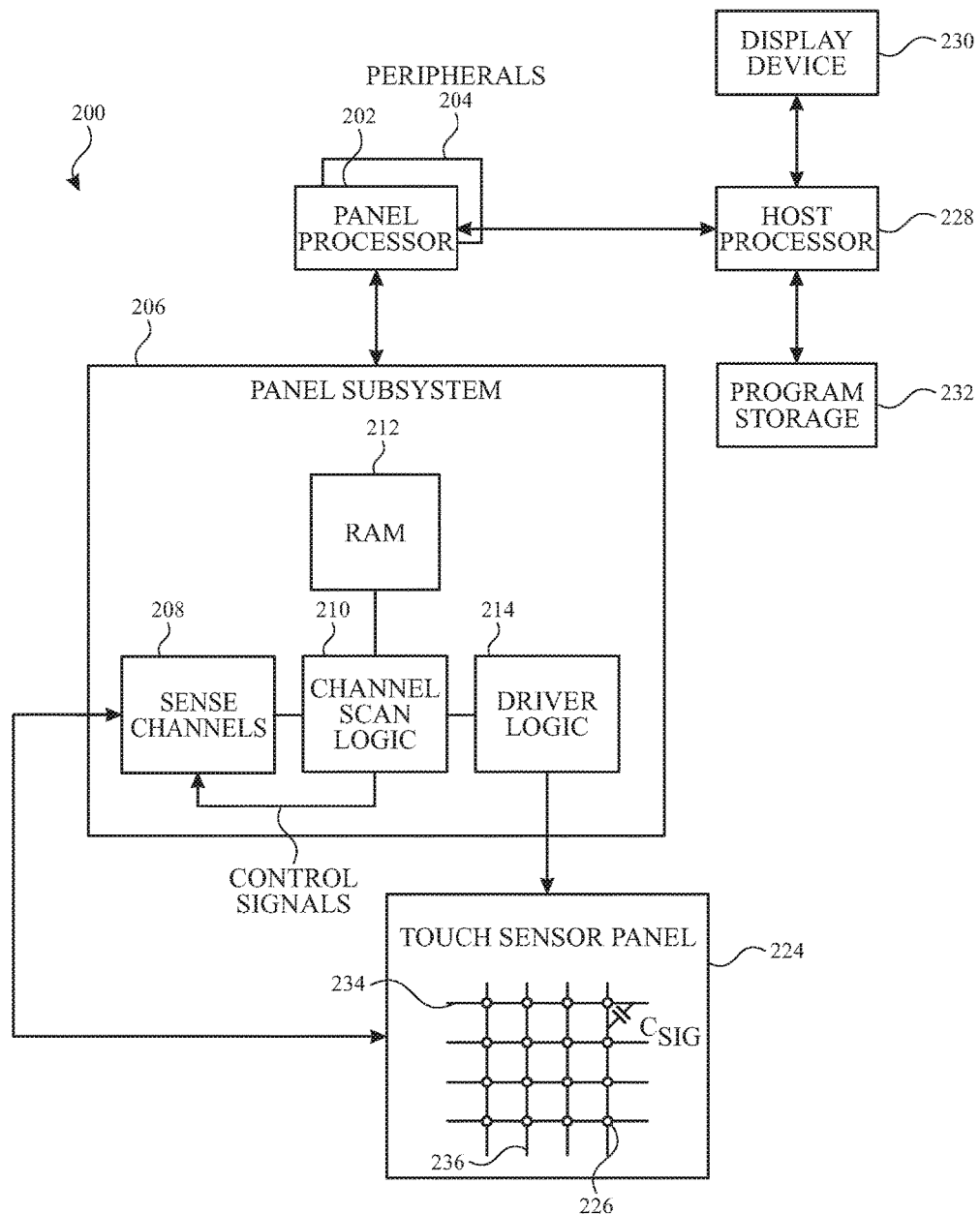
FIG. 2 illustrates an exemplary computing system including a capacitive touch sensor panel that can perform input processing according to examples of the disclosure.

FIG. 2 illustrates an exemplary computing system 200 including a capacitive touch sensor panel 224 that can perform input processing according to examples of the disclosure. Computing system 200 can be included in, for example, mobile telephone 136, digital media player 140, personal computer 144, tablet computing device 148, wearable device 150, or any mobile or non-mobile computing device that includes a touch sensor panel or touch screen. Computing system 200 can include a touch sensing system including one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 nd driver logic (analog or digital) 214. Touch sensor panel 224 can be used to derive touch information at multiple discrete locations of a touch sensor panel referred to herein as touch nodes. In some examples, touch sensor panel 224 can include row electrodes 234 and column electrodes 236. In row-column mutual capacitance touch sensor panel examples, stimulation signals from driver logic 214 can be driven onto row electrodes 234, and sense signals on column electrodes 236 can be sensed by sense channels 208 (also referred to as sense circuitry). Touch or proximity events can alter the capacitive coupling Csig between row electrodes 234 and column electrodes 236 at touch nodes 226 and cause a change to the sense signals on column electrodes 236. However, in row-column self-capacitance touch sensor panel examples, driver logic 214 and sense channels 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. Panel processor 202 can process the data received from scanning the touch sensor panel (e.g., using a low-power touch detection algorithm in a low-power state). In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching the panel or proximate to, but not touching, the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. Each sense electrode of touch sensor panel 224 can be coupled to a sense channel 208 in panel subsystem 206. Touch sensor panel 224 can cover a portion or all of a surface of a device.

Figure 8:
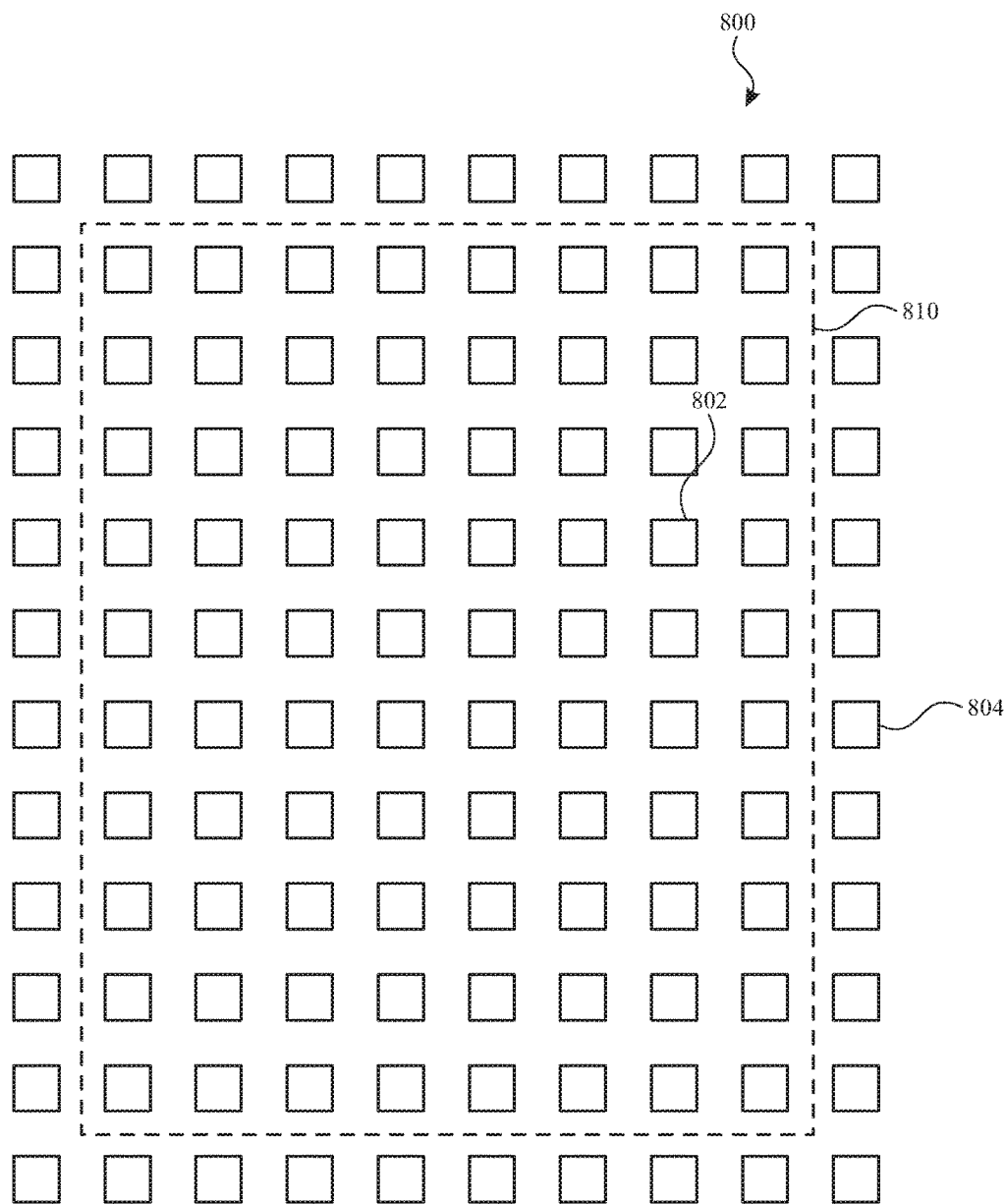
FIG. 8 illustrates an exemplary array of touch nodes of a touch sensor panel according to examples of the disclosure.

In some self-capacitance sensing examples, the touch sensor panel 224 can include a matrix of small plates of conductive material that can be referred to as a touch pixel, touch node, or a touch pixel electrode or touch node electrode (e.g., as illustrated by touch nodes 802 and 804 in FIG. 8). The touch nodes can be formed from a transparent conductive medium such as ITO or ATO, although other transparent and non-transparent materials such as copper can also be used. The touch nodes can be formed on a single side of a transparent substrate. In some examples, a touch screen can include a plurality of individual touch nodes, each touch node identifying or representing a unique location on the touch screen at which touch or proximity (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform (from the driver logic 214), and the self-capacitance to ground of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch sensor panel. Each touch node of touch sensor panel 224 can be coupled to a sense channel 208 in panel subsystem 206. Touch sensor panel 224 can cover a portion or all of a surface of a device. In some examples, the electrodes can be formed from rows and columns of conductive material, and changes in the self-capacitance to ground of the rows and columns can be detected.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when partially or entirely overlapping with the touch sensor panel, can form a touch screen.

In some examples, touch sensor panel 224 and display device 230 together can form an integrated touch screen in which touch nodes of the touch sensing system can be integrated into the display pixel stack-ups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as touch nodes of the touch sensing system. Specifically, each common electrode can operate as a common electrode of the display circuitry of the touch screen (e.g., during a display phase), and can also operate as a common electrode (i.e., a touch node) of the touch sensing system of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch nodes may be either a multi-function circuit element that can form part of the touch sensing system and can perform one or more other functions, such as forming part of the display circuitry, or may be a single-function circuit element that can operate as a touch node only. Similarly, each of the display circuit elements may be either a multi-function circuit element that can operate as display circuitry and perform one or more other functions, such as operating as a touch node, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

Note that one or more of the functions described herein, including the processing of inputs according to examples of the disclosure, can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
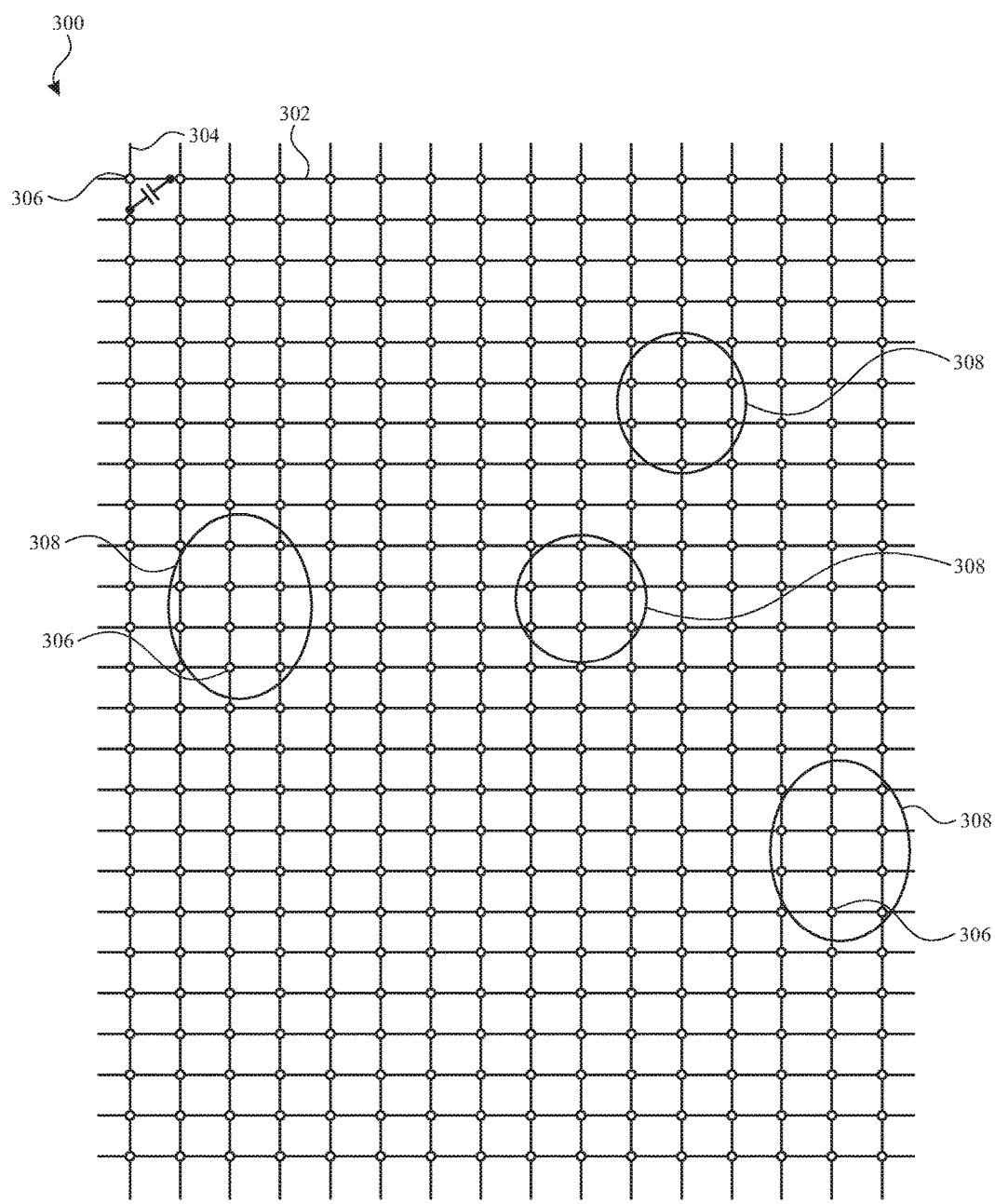
FIG. 3 illustrates an exemplary representation of an image of touch according to examples of the disclosure.

As described above, capacitive measurements (touch signals or data) at the touch nodes of touch sensor panel 224 can be viewed as an image of the touch (or touch image) when processed by panel processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible. Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. By processing the touch image, touch signals from proximate touch nodes 306 (e.g., those touch signals meeting (greater than or equal to) a threshold signal level) can be grouped together to form input patches 308 in a multi-touch image segmentation process. Thus, the input patches 308 can be regions within the image of touch corresponding to touch nodes 306 having signal values produced by an object touching (or proximate to, but not touching, in some examples) the touch screen 300. Although FIG. 3 illustrates a row-column mutual capacitance representation of touch nodes and a touch image formed from touch signal measurements at these touch nodes, a touch image can also be formed from touch signal measurements at touch nodes corresponding to electrodes measuring self-capacitance in a pixelated touch sensor panel. The touch image processing described herein can be performed for generated touch images irrespective of the type of touch sensor panel (e.g., for row-column or pixelated touch sensor panels). The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal (or maximum signal), minimum signal, position, shape, size and/or orientation. In some examples, each input patch can be represented by an ellipse defined by a centroid (location of touch), major and minor axis lengths and/or a major axis (and/or minor axis) orientation (or alternatively an x-axis radius and a y-axis radius). In some examples, the number of touch nodes, peak signal, total signal and/or signal density for each input patch can be computed. In some examples, the number of touch nodes, peak signal and/or peak signal density can be tracked for each path across multiple touch images.

For example, the number of touch nodes in a path can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \text{ in } P} [V^2_{[i][j]}] \quad (1)$$

where $Z_p$ can represent the total signal for an input patch, V can represent the signal value at a touch node and i, j can represent the row and column coordinate of each touch node. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,P} = \frac{Z_P}{\text{geometric mean radius of } P} \quad (2)$$

$$Z_{density,P} = \frac{Z_P}{\text{number of touch nodes forming } P} \quad (3)$$

A multi-touch sensing system may use a segmentation process to discriminate between different input patches and compute characteristics for all input patches identified in an acquired image. Additionally, such a multi-touch sensing system may process patches corresponding to intentional, actual touches as well as input patches corresponding to unintended touches. In some examples, in a low-power state, a simplified touch detection algorithm can be performed without requiring the significant processing resources for touch image segmentation and parameterization of multiple touches.

While the examples of the disclosure are generally described herein as occurring during a low-power state (e.g., a sleep state) or an active state (e.g., an awake state), in some examples, the electronic device can have more than two states of operation, including multiple low-power states. For example, the electronic device can have a plurality of states corresponding to and defining a different manner of operation for the electronic device. For example, in the active state, a display of the electronic device (e.g., the display component of the touch screen of the electronic device) can be active (e.g., displaying one or more images), and processing circuitry associated with sensing touch on the touch screen of the electronic device can be operating at a given state of readiness (e.g., touch controller 206 and/or touch processor 202 can be powered on at full power operation). In various states of the electronic device, some of the processing circuitry associated with sensing touch on the touch screen of the electronic device can be disabled or in a reduced-activity/reduced-power state (e.g., touch controller 206 and/or touch processor 202 can be disabled or continue operation to various degrees in reduced-power operation), though the display of the electronic device (e.g., the display component of the touch screen of the electronic device) may or may not remain active.

In some examples, the electronic device can transition from the active state to the one or more low-power states automatically based on periods of inactivity of the touch screen (e.g., with lower power states triggered as the duration of inactivity increases. Additionally or alternatively, the electronic device can transition to one of the low-power states in response to a command received from the system or from a user of the electronic device. For example, the user can select a low-power state from a menu or select an application. In some examples, the user can press a specific button on the electronic device, or can completely cover the touch screen of the electronic device (e.g., with a hand), to transition the electronic device to low-power state (e.g., sleep state)

As described herein, when an electronic device including a touch screen according to examples of the disclosure (e.g., mobile phone, portable media player, tablet computer, wearable device, etc.) is in an active, non-low-power state (e.g., an awake state in which its display and/or other components are turned on), the electronic device can sense touch on its touch screen in the manners described above. When the electronic device is in a low-power state (e.g., a sleep state in which its display and/or other components are turned off), in some examples, the electronic device may disable touch sensing (e.g., turn off its drive and/or sense circuitry) to conserve power. In some examples, the electric device can transition from a low-power state to an active state in response to the user input independent of the touch screen (e.g., a hardware button, accelerometer, etc.) In some examples, the electronic device can continue to sense touch on its touch screen while in the low-power state to allow the electronic device to respond to certain touch inputs while consuming less power due to touch sensing than while in the active state (not a low-power state). For example, sensing touch during the sleep state can allow the electronic device to wake (e.g., transition from the sleep state to the awake state) in response to detecting a certain touch input (e.g., a tap or other touch input) on its touch screen while in the sleep state. In some examples, the electronic device may only wake in response to detecting certain touch inputs (e.g., a tap) during the sleep state, and may not wake in response to detecting other touch inputs (e.g., a swipe, or a long press) during the sleep state. As described herein, low-power input processing algorithms can reduce the processing requirements necessary to detect certain touch inputs in a low-power state (e.g., sleep state).

Figure 4A:
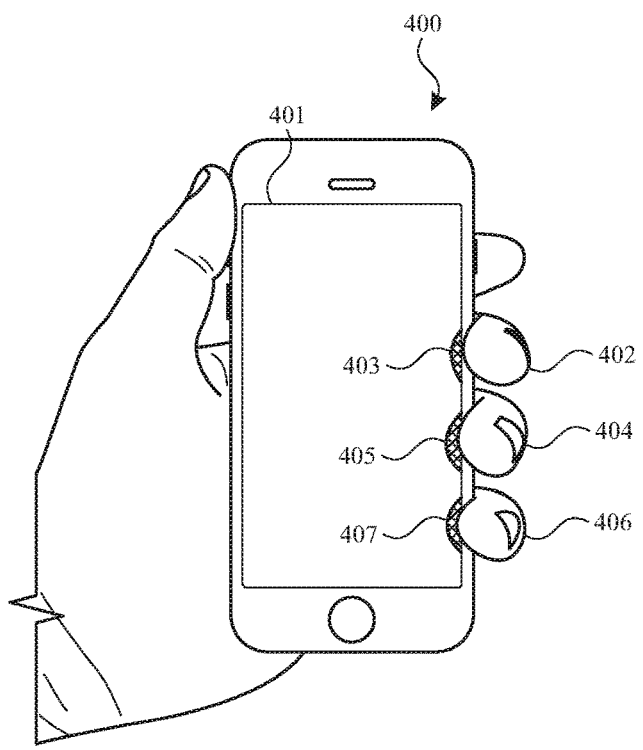
FIGS. 4A-C illustrate exemplary touch images including intended and unintended touches according to examples of the disclosure.
Figure 4B:
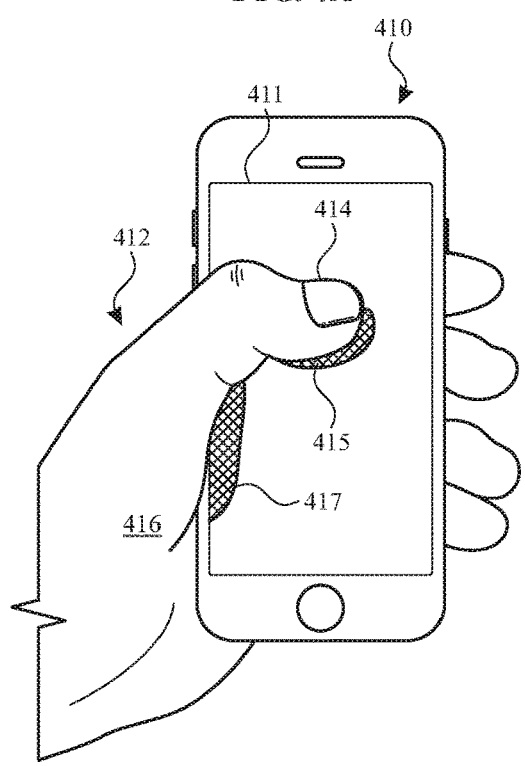
Figure 4C:
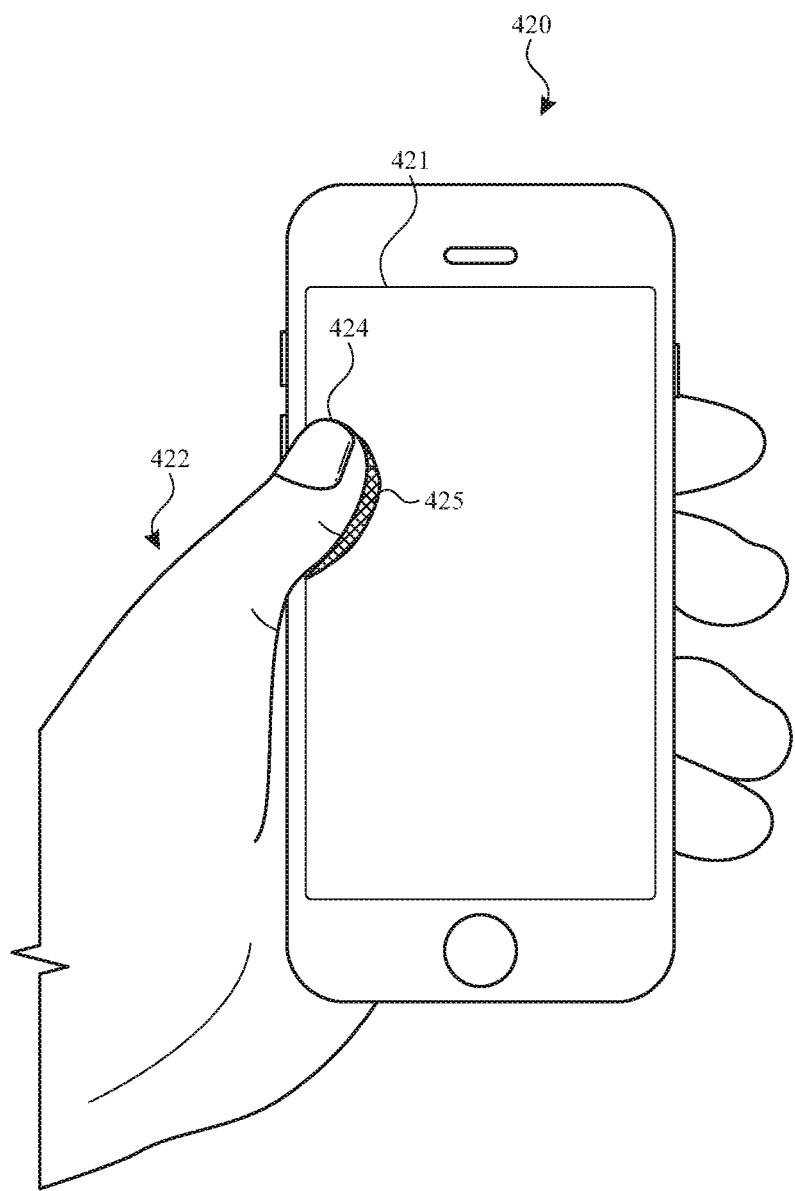

For example, the touch detection algorithm can look for certain touch inputs to trigger a transition from a sleep state to an awake state without requiring multi-touch image segmentation. Touch performance using a simplified touch detection algorithm for a multi-touch-sensitive surface without multi-touch image segmentation, however, may decline due to unintended touches along edges of a touch sensor panel or touch screen. These unintended touches along the edges of a touch sensor panel or touch screen, if not properly handled, can cause registering of unintended touch inputs and/or masking or misinterpreting intended touch inputs, for example. FIGS. 4A-C illustrate exemplary touch images including intended and unintended touches according to examples of the disclosure. FIG. 4A illustrates an electronic device 400 including a touch screen 401 (e.g., corresponding to mobile telephone 136 in FIG. 1A). A user can grip the electronic device 400 with a hand such that one or more fingers of the gripping hand may come into proximity or contact with edges of touch screen 401 and unintentionally generate touch input. For example, fingers 402, 404 and 406 may cause the appearance of touch signals meeting (greater than or equal to) a touch signal threshold to be detected in input patches 403, 405 and 407 in the touch image corresponding to the area of touch screen 401. Without proper handling by the touch detection algorithm, these unintended edge touches could be falsely detected as touch input and trigger unintended behavior by the device (thereby harming the user experience).

FIG. 4B illustrates an electronic device 410 including a touch screen 411 (e.g., corresponding to mobile telephone 136 in FIG. 1A). A user can grip the electronic device 410 with a hand 412 and press or tap the screen with a finger such as thumb 414. As a result of reaching with thumb 414 to tap touch screen 411, a portion of hand 412 (e.g., part of palm 416 or thumb 414) may come into proximity or contact with touch screen 411 and unintentionally generate touch input in addition to the intended touch input from the tip of thumb 414. For example, a portion of palm 416 may straddle the edge of device 410 causing the appearance of touch signals meeting (greater than or equal to) a threshold signal level to be detected in input patch 417 in the touch image corresponding to the area of touch screen 401. Without proper handling by the touch detection algorithm, this unintended edge touch by a portion of palm 416 straddling the edge could cause the centroid of the unsegmented touch input to be offset away from the true centroid of intended touch patch 415 corresponding to the tip of thumb 414 and/or increase the size of the unsegmented touch input. This centroid offset and/or change in size caused by the straddling palm may cause the actual touch input to be masked or misinterpreted, thereby triggering unintended behavior or failing to trigger intended behavior by the device. The unintended behavior can harm the user experience.

Touches along the edge of the touch screen, however, may not be unintentional. FIG. 4C illustrates an electronic device 420 including a touch screen 421 (e.g., corresponding to mobile telephone 136 in FIG. 1A). A user can grip the electronic device 420 with a hand 422 and press or tap near an edge of the screen with a finger such as thumb 424 (e.g., with or without triggering an unintended edge contact elsewhere on the touch screen). Without proper handling by the touch detection algorithm, this intended touch patch 425 corresponding to the tip of thumb 424 might be ignored (or offset by another unintended edge contact elsewhere on the touch screen). Masking or misinterpreting an actual touch input along the edge can cause failure to trigger intended behavior by the device. The unintended behavior can harm the user experience. Examples of low-power touch detection algorithms described herein can properly handing intended and unintended edge touches.

In addition to low-power input processing algorithms, other differences in the touch sensing performed in a low-power state can reduce power consumption as described in U.S. patent application Ser. No. 15/690,565, "LOW POWER TOUCH SENSING DURING A SLEEP STATE OF AN ELECTRONIC DEVICE" to Taif A. SYED et al., the disclosure of which is herein incorporated by reference in its entirety for all intended purposes. For example, in some examples, the length(s) of one or more scan steps (i.e., the "integration time") can be shorter in a low-power state (e.g., sleep state) than the length(s) of one or more corresponding scan steps in an active state (e.g., awake state). Additionally or alternatively, in some examples, the electronic device can reduce power consumption in the sleep state by reducing the quantity of active drive and/or sense circuitry in a sleep state. For example, electrodes can be ganged together to share drive and/or sense circuitry (e.g., sacrificing spatial touch resolution), and unused drive and/or sensed circuitry can be powered down.

Figure 5:
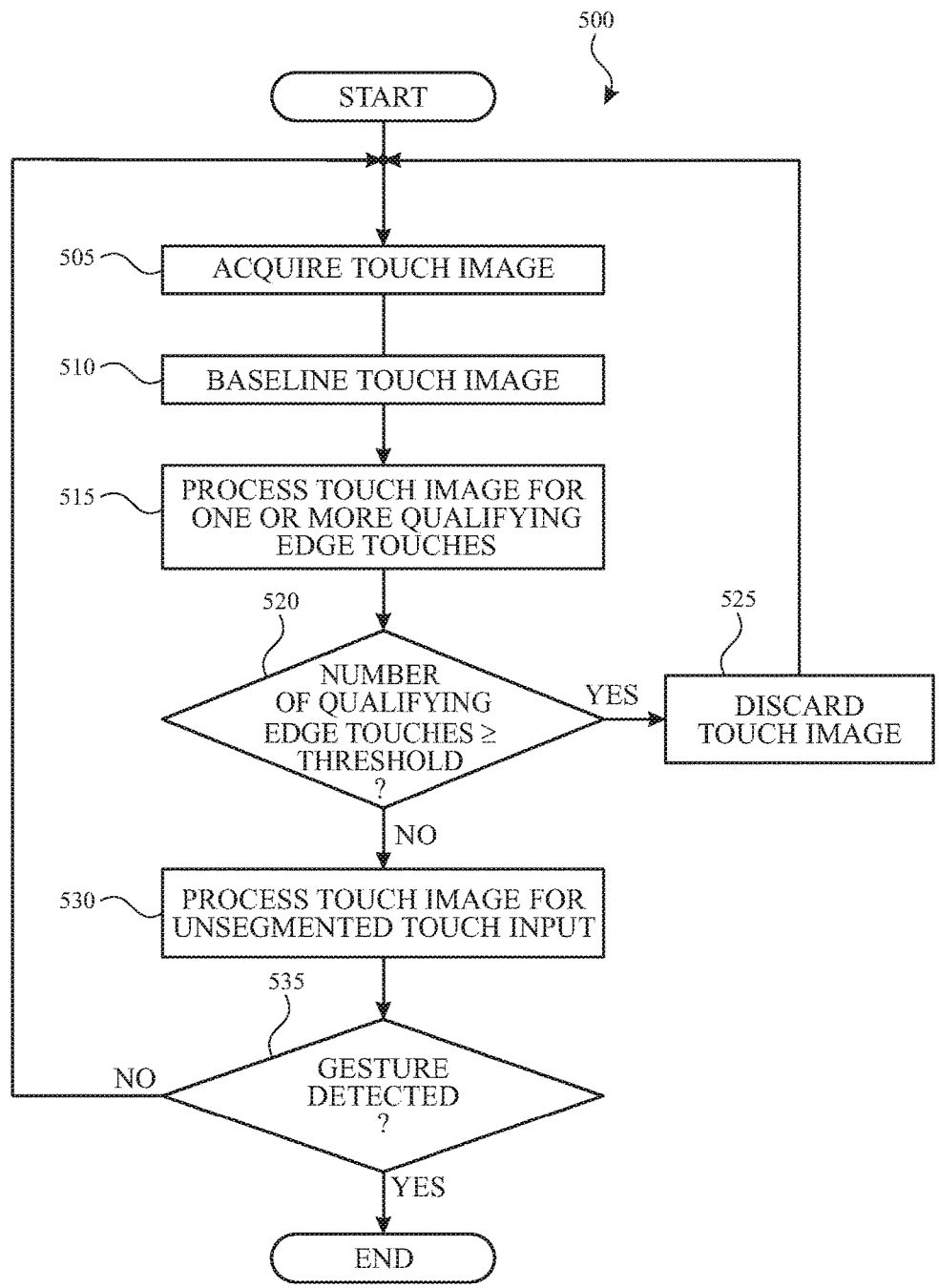
FIG. 5 illustrates an exemplary process for processing a touch image in a low-power state according to examples of the disclosure.

FIG. 5 illustrates an exemplary process 500 for processing a touch image in a low-power state according to examples of the disclosure. At 505, a touch image can be acquired. The touch image can include touch node measurements for the touch nodes in the touch sensor panel of an electronic device. In some examples, one or more rows or columns of touch nodes (e.g., around the perimeter of the touch sensor panel) can be excluded from the touch image. At 510, the acquired touch image can be baselined (e.g., by subtracting a baseline image from the acquired touch image). As described in more detail below, the baseline can be selected from an earlier acquired touch image, for example, and can be used to filter out background noise and/or filter out some unintended edge touches, which can enable detection of an intended gesture. At 515, the baselined touch image can be processed to identify one or more qualifying edge touches meeting various criteria (edge touch node and reference node criteria, grouping criteria, boundary conditions) such that the qualifying edge touches can identify potential unintended edge touches. When the number of qualifying edge touches meets (greater than or equal to) a threshold (520), the touch image can be discarded at 525. For example, as illustrated in FIG. 4A, when a plurality of fingers of a hand holding the device appear in a touch image, the touch image can be discarded. When the number of qualifying edge touches fails to meet (less than) the threshold (520), the touch image can be processed to detect an unsegmented touch input at 530. For example, as illustrated in FIG. 4B, when a finger tapping the interior of the touch screen and a straddling portion of a palm appear in a touch image, the touch image can be processed to exclude the region of the touch image including the straddling palm and process the remaining touch image for an unsegmented touch input. The unsegmented touch input can be tracked over multiple acquired touch images (e.g., multiple frames), to detect a gesture at 535. For example, the gesture can be a tap gesture subject to various conditions including, location, duration and movement. When the intended gesture is detected, the system can transition from a low-power state (sleep state) to an active, full-power state (awake state). When the intended gesture is not detected, the system can continue to remain in the low-power processing state.

Figure 6:
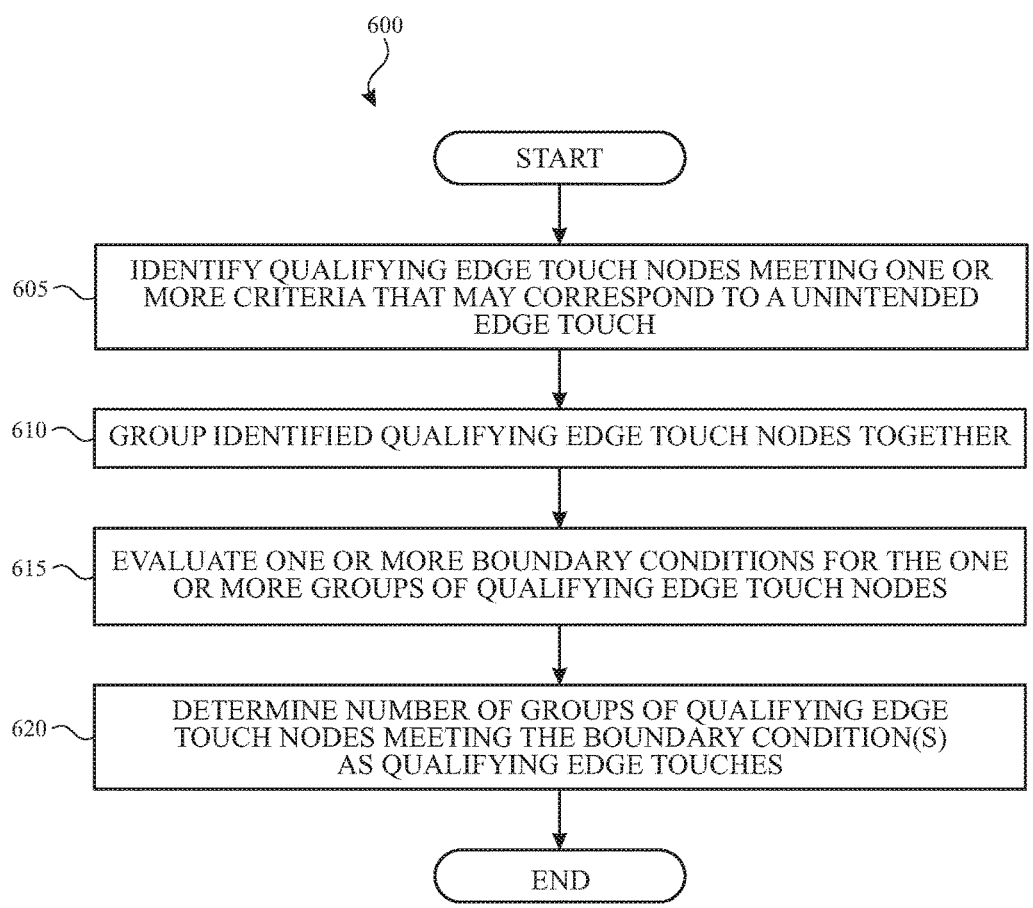
FIG. 6 illustrates an exemplary process for processing a touch image for one or more qualifying edge touches according to examples of the disclosure.

FIG. 6 illustrates an exemplary process 600 for processing a touch image for one or more qualifying edge touches according to examples of the disclosure. Process 600 can correspond to 515 in process 500. At 605, one or more edge touch nodes can be identified as qualifying edge touch nodes meeting one or more criteria for touch nodes corresponding to a potential unintended edge touch. The one or more criteria can include an edge touch node signal criterion identifying touch nodes in a first region of the touch image meeting a first signal threshold (e.g., greater than or equal to a first signal threshold) and a reference touch node signal criterion identifying corresponding reference touch nodes in a second region of the touch image meeting a second signal threshold (e.g., less than a second threshold). Using a reference touch node criterion can help differentiate between intentional and unintentional touches that may both satisfy the edge touch node signal criterion. For example, an intended touch near the edge touch nodes may cause the touch signal at reference touch nodes to be equal to or exceed a second signal threshold (indicative of the input patch extending away from the edges of the touch sensor panel toward a center of the touch sensor panel), whereas an unintended touch at the edge touch nodes may not cause the touch signal at reference touch nodes to be equal to or exceed the second signal threshold. At 610, edge touch nodes meeting the one or more criteria to be identified as qualifying edge touch nodes can be grouped together into one or more groups (e.g., using grouping criteria). At 615, one or more boundary conditions can be evaluated for the one or more groups of qualifying edge touch nodes. For example, the boundary conditions can distinguish between characteristics of unintended edge touches and intentional touches near the edge. At 620, groups of qualifying edge touch nodes meeting grouping criteria and the one or more boundary conditions can be identified as qualifying edge touches. The number of qualifying edge touches can be used at 520 in process 500 to determine whether to discard the touch image or continue processing the unsegmented touch image for the particular touch input.

Figure 7:
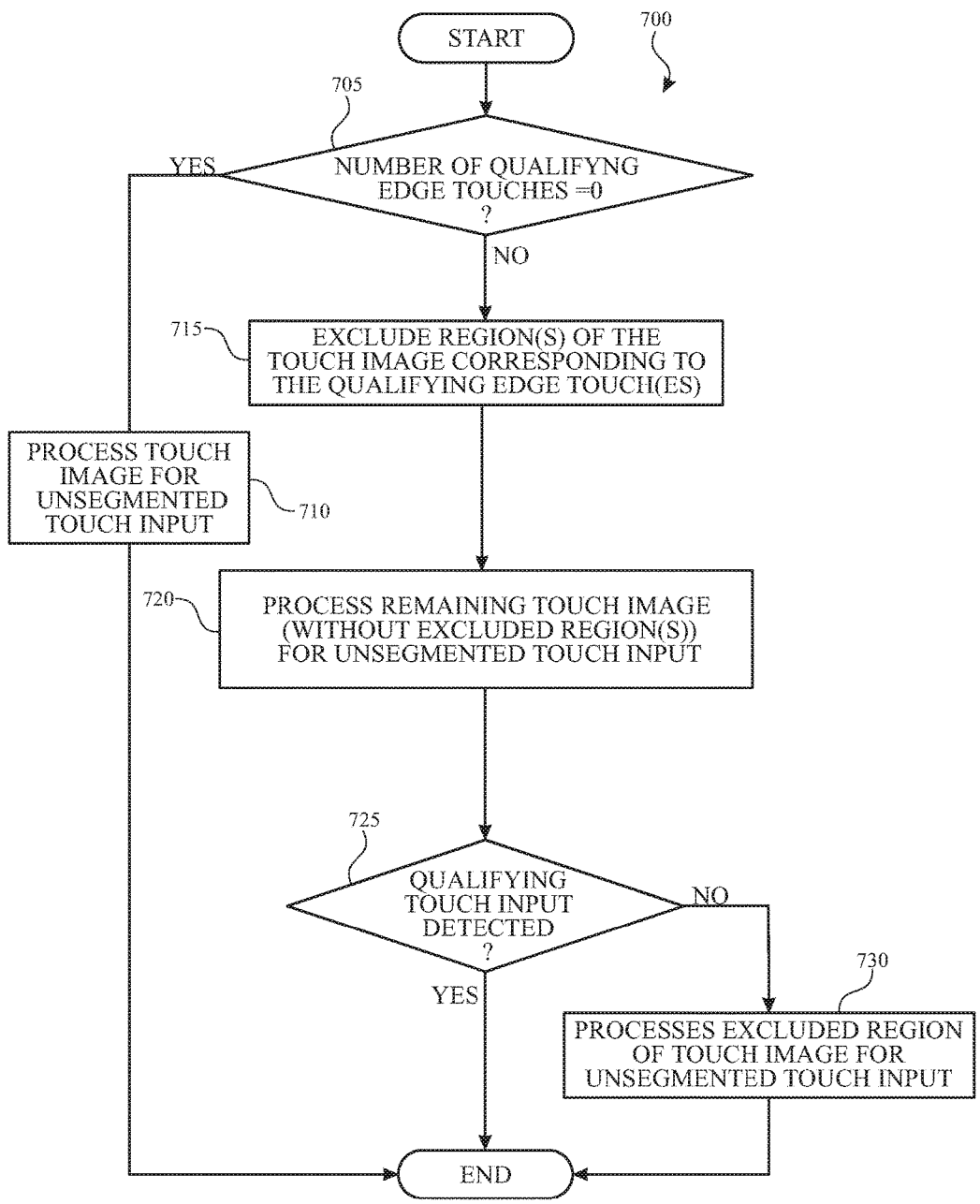
FIG. 7 illustrates an exemplary process for processing a touch image for unsegmented touch input according to examples of the disclosure.

FIG. 7 illustrates an exemplary process 700 for processing a touch image for unsegmented touch input according to examples of the disclosure. Process 700 can correspond to 530 in process 500. The processing of the touch image can depend on the number of qualifying edge touches determined from process 600. When the number of qualifying edge touches is determined to be zero at 705, the touch image can be processed for unsegmented touch input at 710. For example, a centroid can be determined for the touch nodes in the baselined touch image. Other parameters (e.g., one or more radii, signal density, etc.) can be calculated as well. The centroid and other parameters can be calculated without first identifying different input patches in the touch image using a segmentation process. When the number of qualifying edge touches is determined to be non-zero at 705 (and less than the threshold number of qualifying edge touches at 520), one or more regions of the touch image corresponding to the one or more qualifying edge touches can be excluded from the touch image at 715. In some examples, the threshold number of qualifying edge touches can be two so only one region of the touch image corresponding to an unintended touch can be excluded. In some examples, the region of the touch image to be excluded ("exclusion region") can be an arrangement of touch nodes with a linear shape (e.g., a rectangle). In some examples, the region of the touch image to be excluded can be a non-linear shape (e.g., better corresponding to the signal profile of the unintended edge touch). At 720, the touch image, with the exclusion region, can be processed for unsegmented touch input. For example, a centroid (and other parameters) can be determined for the touch nodes in the baselined touch image excluding the touch nodes in the exclusion region. At 725, the touch parameters determined at 720 can be evaluated for a qualifying touch input (e.g., an input patch with signal parameters meeting one or more qualifying criteria). If a qualifying touch input is detected at 725, the touch input can be used for detection of a gesture at 535. If a qualifying touch input is not detected at 725, the exclusion region of the touch image can be processed for an unsegmented touch input at 730. The processing of the unsegmented touch input at 730 can be used to detect an intended touch near the edge of the touch sensitive surface (e.g., as illustrated in FIG. 4C).

As described herein, in some examples, a device may sense touch at all touch nodes or fewer than all touch nodes in a touch sensor panel in a low-power state. FIG. 8 illustrates an exemplary array 800 of touch nodes of a touch sensor panel according to examples of the disclosure. The touch nodes in array 800 can correspond to an array of small plates of conductive material of a pixelated touch sensor panel (e.g., configured to measure self-capacitance). Although illustrated in this fashion in FIGS. 8-12B, the touch nodes can also correspond to a row-column touch sensor panel measuring mutual capacitance at touch nodes formed at the intersections between drive lines and sense lines. Array 800 can span the dimensions of the touch screens illustrated in the systems of FIGS. 1A-1E, for example. In some examples, even during a low-power state each touch node of the touch sensor panel in array 800 (including touch nodes 802 and 804) can be sensed. In some examples, touch nodes at the edge of the touch sensor panel can be excluded and not sensed (allowing some driving and/or sensing circuitry to be powered down or otherwise remain inactive). For example, touch nodes interior to region 810 of array 800 can be sensed (e.g., including touch node 802), and touch nodes external to region 810 (e.g., including touch node 804) can be not sensed. The touch nodes external to region 810 can correspond to touch nodes near the edges of the touch sensor panel, which can be susceptible to increased touch signal due to fingers near the edges of the device or in proximity, but not contacting, the touch-sensitive surface near a conductive edge of the device housing (e.g., a metallic bezel). Irrespective of whether some or all touch nodes are sensed in a low-power state, the low-power touch input processing can, in some examples, rely on a touch image including the touch nodes of interest within region 810 and excluding touch nodes outside region 810. Thus the touch image acquired at 505 can include touch signals sensed from touch nodes within region 810, which can reduce processing requirements compared with processing the touch image including all the touch nodes in array 800. Although FIG. 8 illustrates one row and one column around the perimeter of the array as being excluded from region 810, in some examples, fewer or more touch nodes can be excluded. For example, two or more rows and two or more columns around the perimeter can be excluded in some examples. In some examples, one or more rows of touch nodes (but not one or more columns of touch nodes) can be excluded or one or more columns of touch nodes (but not one or more rows of touch nodes) can be excluded. In some examples, different numbers of rows and columns can be excluded (e.g., two columns and one row). Additionally, although FIG. 8 illustrates a rectangle region 810, region 810 can be a linear or non-linear shape in some examples.

In some examples, the electronic device may require that the touch input for waking the electronic device from a low-power state (e.g., sleep state) be detected in a specific region of the touch screen. For example, the electronic device may only accept device-waking input that is detected in the center region of the touch screen, and not around the edges of the touch screen (e.g., to prevent fingers positioned around the edges of the device while a user is holding device from waking the device unintentionally). Region 810 can be defined to include the specific region in such examples (e.g., possibly including some margin around the specific region in region 810).

As mentioned above, the electronic device can utilize baseline touch data (e.g., a baseline image). Comparing the touch image to a baseline (e.g., by subtracting the baseline image from the touch image) can help in determining whether any touch activity is likely occurring on the touch screen (e.g., by comparing measured touch data in the acquired touch image to the baseline touch data). In some examples, the baseline touch data can correspond to touch data captured when there is no touch activity on the touch screen. The electronic device can utilize baseline touch data in order to remove background signal and noise to determine the location(s) and/or amount(s) of touch on the touch screen. In some examples, the electronic device can have stored in its memory such baseline touch data for use in baselining. In some examples, the electronic device can acquire baseline touch data for each type of touch scan it performs (e.g., ganged/common-mode vs. un-ganged/active mode), and for each frequency it might utilize for each of those types of scans (e.g., each of a predetermined number of frequencies that may be analyzed by a spectral analysis scan to identify a low noise frequency at which to perform touch scans).

In some examples, the baseline can be periodically updated. The actual touch data measured on the touch screen when there is no touch activity on the touch screen can change over time due to changes in temperature, humidity or other environmental conditions at the electronic device. Updating the baseline(s) can account for these changes. In some examples, the baselines can be updated periodically even when in the low-power state when no touch activity is detected for long periods of time, and can store the baseline touch data for use in future scans. In some examples, the baseline can be updated every frame. In some examples the baseline can be updated every N frames (e.g., 3 frames, 10 frames, etc.). In some examples, the baseline can be updated based on a triggering condition (e.g., change in temperature or humidity or motion measured by other sensors in the device). In some examples, the baseline can be updated less frequently in the low-power state than in an active state.

Additionally, in some examples, the baselining at 510 can do more than simply remove background touch signal and noise corresponding to a no-touch condition. In some examples, the baselining can further include removing unintended edge touches, such as those shown in FIG. 4A. For example, the baseline applied at 510 can include feedback from processing the touch image for one or more qualifying edge touches at 515. For example, when a touch image is discarded at 525 (e.g., because there are more than a threshold number of qualifying edge touches), the baseline applied in the baselining at 510 can include baselining to remove the qualifying edge touches corresponding to the discarded touch image. In this way, these edge touches can be filtered out from subsequent touch images at the baselining step at 510, rather than requiring repeated processing at 515. This updated baseline can mask out unintended edge touches, such as those illustrated in FIG. 4A. However, when a potential input is detected (e.g., a tap gesture), the baseline applied at 510 in the current iteration of process 500 can be the baseline from the touch image before the detection of the potential input, which can be frozen and used in future iterations of process 500. Freezing the baseline can avoid masking intended touches from the touch image. The baseline can be unfrozen once the intended touch input disappears from the touch image (e.g., once the finger lifts off) or, in some examples, the baseline can be unfrozen a threshold period of time after the potential input is no longer detected.

Figure 13:
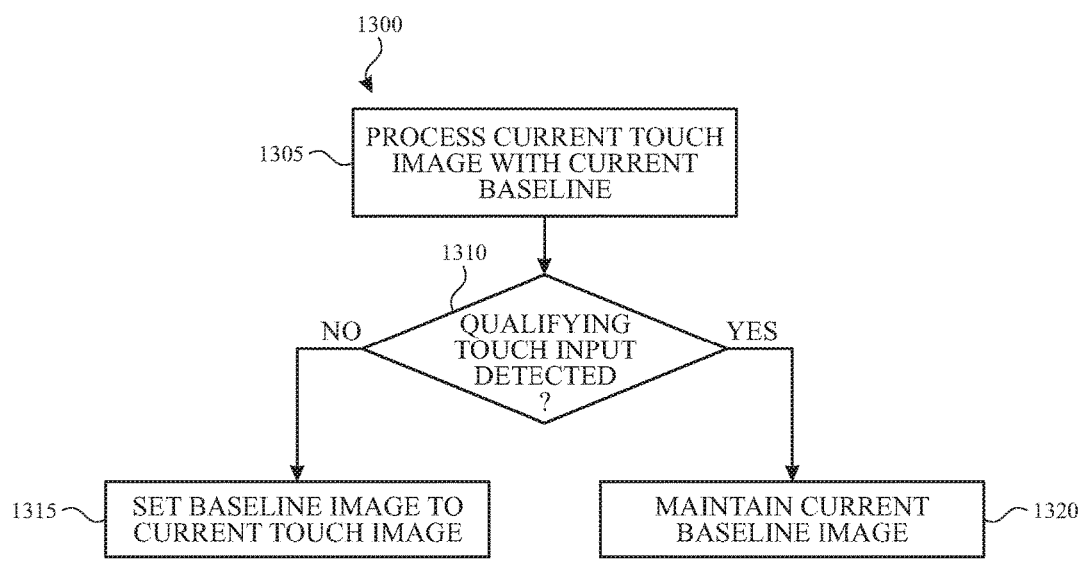
FIG. 13 illustrates an exemplary process for determining a baseline in a low-power state according to examples of the disclosure.

FIG. 13 illustrates an exemplary process 1300 for determining a baseline in a low-power state according to examples of the disclosure. At 1305, the current touch image can be processed with the current baseline (e.g., according to 505-530 of process 500. At 1310, the unsegmented touch input can be evaluated for a qualifying touch as described herein. When a qualifying touch is not detected, the baseline image can be updated and set to the current touch image at 1315. As a result, processing the next touch image can include baselining the next touch image with the previous touch image. This differential image can filter out unintended edge touches, for example. At 1320, when a qualify touch is detected, the baseline image can maintained the current baseline, which can remain the baseline while the qualifying touch is detected. As described above, in some examples, the determination at 1310 can look not only at the current touch image, but also at the results of earlier touch images so as to keep the baseline frozen a threshold period of time after the detection of a qualifying touch.

As described herein, in some examples, processing a touch image for one or more qualifying edge touches (e.g., in process 700) may include examining touch signals at touch nodes in a first region corresponding to edges of region 810 ("edge touch nodes") and reference touch nodes in a second region. Each edge touch node can have a corresponding reference node (which may be a unique reference node or a shared reference node, as described in more detail below). An edge touch node can be identified as a qualifying edge touch node (candidate for potential unintended edge touches) when the edge touch node meets (is greater than or equal to) a first signal threshold and the corresponding reference node meets (is less than) a second signal threshold. In some examples, these threshold criteria can be relaxed, as described in more detail below.

Figure 9A:
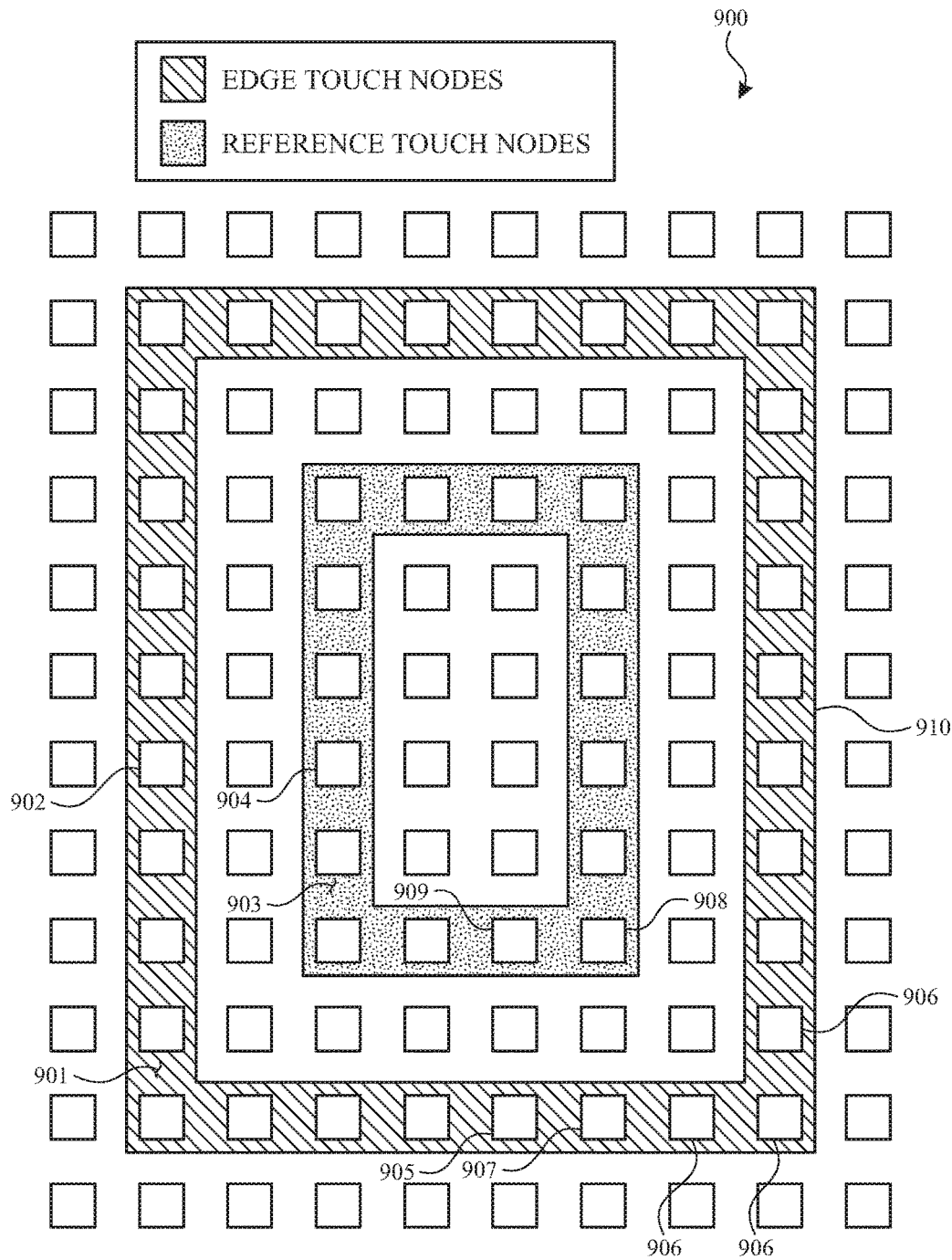
FIG. 9A illustrates an exemplary array of touch nodes of a touch sensor panel, including touch nodes in a first region and reference touch nodes in a second region, according to examples of the disclosure.

FIG. 9A illustrates an exemplary array 900 of touch nodes of a touch sensor panel, including touch nodes in a first region and reference touch nodes in a second region, according to examples of the disclosure. In some examples, the first region 901 can be defined to include edge touch nodes of the touch image, where the "edges" can be referenced to the interior of region 910 (e.g., corresponding to region 810). Thus, edge touch nodes in FIG. 9A can include edge touch nodes along the interior perimeter of region 910 including touch nodes 902 and 906. The touch nodes along the perimeter can be compared with a first touch signal threshold for edge touch nodes. Those edge touch nodes meeting (e.g., greater than or equal to) the first touch threshold for edge touch nodes can be identified as satisfying a first of the criteria for qualifying edge touch nodes. Those edge touch nodes failing to meet (e.g., less than) the first signal threshold for edge touches can be identified as failing to satisfy this first criterion. Although the first region 901 illustrated in FIG. 9A, includes edge touch nodes along the interior perimeter of region 910, it should be understood that in some examples, the first region 901 can include fewer or more touch nodes. For example, FIGS. 4A-4C illustrate that in many use cases the unintended edge touches occur along a major axis of the device, and as a result the first region 901 can include the touch nodes along the major axis of the perimeter of region 910 (e.g., the sides), but not include those along the minor axis of perimeter of region 910 (e.g., the top and bottom). In some examples, rather than first region 910 having a width of one touch node around the perimeter, the width can be greater (e.g., two touch nodes) and/or can be variable around the perimeter of region 910 (e.g., two touch nodes along the major axis and one touch node along the minor axis).

The reference touch nodes including touch nodes 904 and 908 can be in a second region 903 of the array. For example, the reference nodes can be a set a distance or a set number of touch nodes away from the edge touch nodes disposed along the perimeter of region 910. The distance between the reference touch nodes and the perimeter edge touch nodes can be set based on empirical measurements of unintended edge touches, and the distance to a corresponding reference touch node may be uniform or variable (depending on the edge touch node). For example, unintended edge touches can have a characteristic that the touch signal exceeds the first signal threshold at edge touch nodes but then rolls off and falls below the second signal threshold at reference touch nodes. The reference touch nodes can be compared with a second touch signal threshold set for reference touch nodes. Those edge touch nodes whose corresponding reference touch nodes meet (e.g., are less than) the second touch signal threshold can be identified as satisfying a second of the criteria for qualifying edge touch nodes. Those edge touch nodes whose corresponding reference touch nodes fail to meet (e.g., are greater than or equal to) the second touch signal threshold for edge touches can be identified as failing to satisfy this second criterion.

In the example of FIG. 9A, the reference nodes and the edge touch nodes are separated by one intervening touch node. This distance is merely for illustration purposes, however, and the distance can be different in other examples. For example, the separation could be more than one intervening touch node, in some examples. In some examples, the separation could be a non-uniform number of touch nodes between respective edge touch nodes and reference nodes. In some examples, the number of edge touch nodes may exceed the number of reference nodes (e.g., as illustrated in FIG. 9A) and some of the reference touch nodes can be shared. For example, edge touch node 902 can use reference touch node 904 as its reference touch node, and can be the only edge touch node to use reference touch node 904. In contrast, edge touch nodes at or proximate to (within a threshold distance of) a corner can share one or more reference touch nodes. For example, corner edge touch nodes 906 can share reference touch node 908, and edge touch nodes 905 and 907 can share reference touch node 909. In some example, edge touch node 907 can use reference touch node 908 as well. In some examples, each edge touch node can have a unique reference touch node.

Figure 9B:
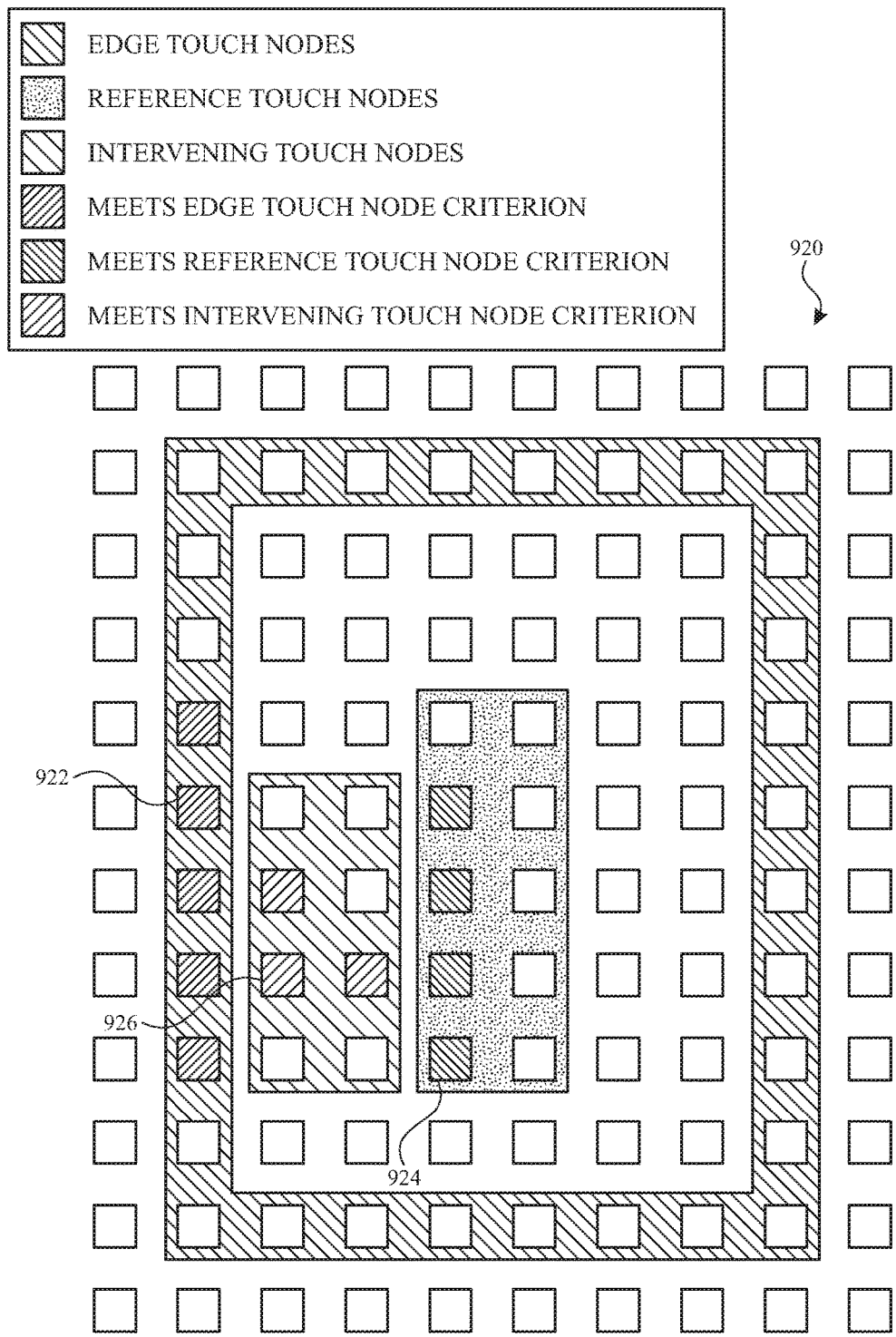
FIG. 9B illustrates exemplary selective processing of reference touch nodes and one or more touch nodes between an edge touch node and corresponding reference touch node according to examples of the disclosure.

In some example, touch signals at reference touch nodes can be compared with the second signal threshold in parallel to (or sequentially with) the comparison of touch signals at edge touch nodes with the first signal threshold. In some examples, the reference nodes can be compared with the second signal threshold only when their corresponding edge touch nodes meet (are greater than or equal to) the first signal threshold. Additionally or alternatively, in some examples, additional touch nodes between the edge touch nodes and the reference touch nodes can be compared with the first signal threshold. FIG. 9B illustrates exemplary selective processing of reference touch nodes and one or more touch nodes between an edge touch node and corresponding reference touch node according to examples of the disclosure. As illustrated in FIG. 9B, edge touch nodes in the first region of array 920 can first be compared with the first signal threshold, and a subset of the edge touch nodes (e.g., including edge touch node 922) can meet (greater than or equal to) the first signal threshold. For this subset of edge touch nodes, corresponding reference touch nodes can be compared with the second signal threshold, and a subset of reference touch nodes (e.g., including reference touch node 924) can meet (less than) the second signal threshold. In some examples, the four edge touch nodes meeting (greater than or equal to) the first signal threshold and whose corresponding reference touch nodes meet (less than) the second touch signal threshold can be identified as qualifying edge touch nodes. Additionally, in some examples, additional touch nodes (e.g., including touch node 926) between the edge touch nodes identified as qualifying edge touch nodes and the corresponding reference touch nodes can be compared against the first signal threshold (or one or more different signal thresholds). This additional information can be used, in some examples, to generate an exclusion region, as described in more detail below.

Figure 10:
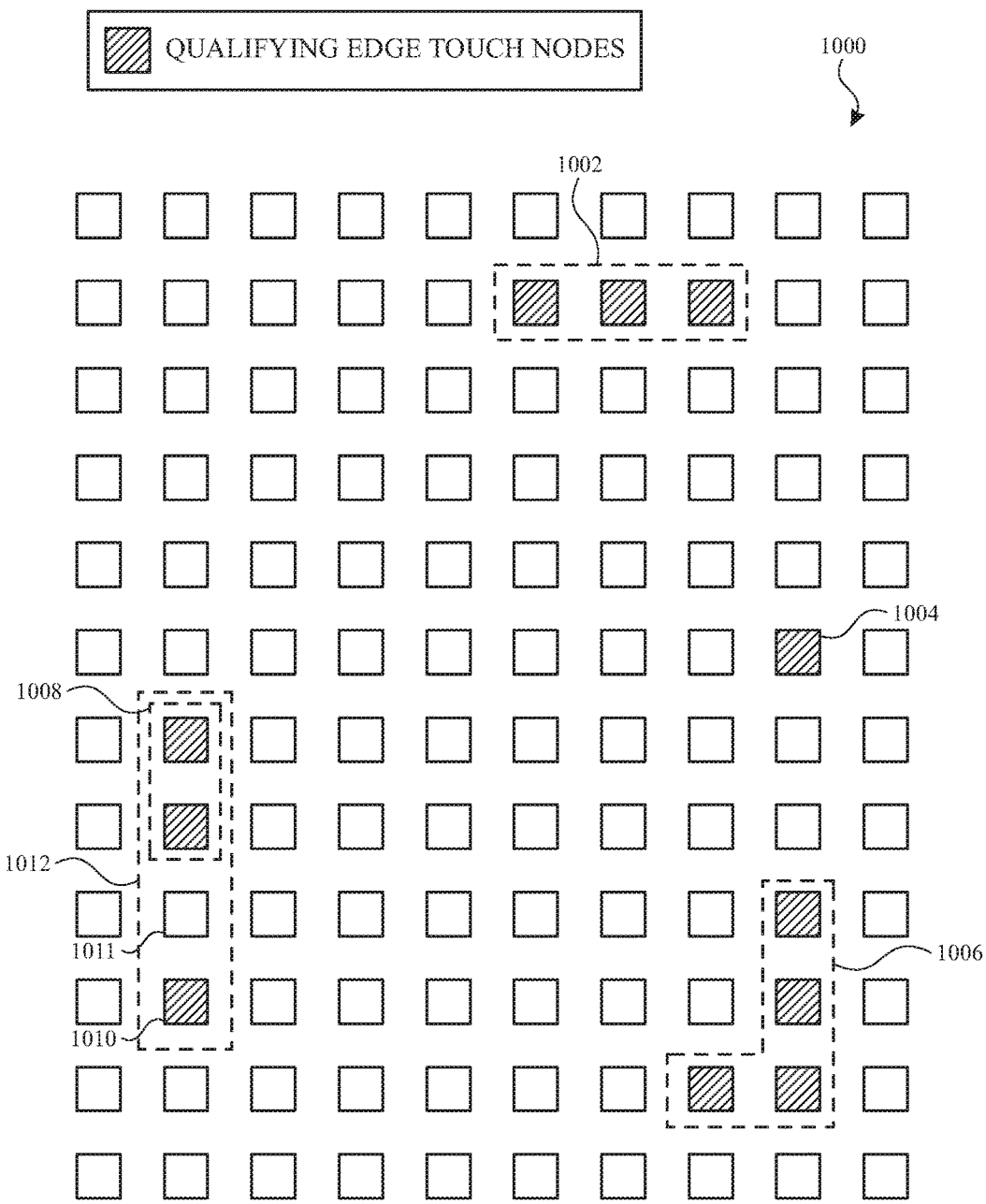
FIG. 10 illustrates an exemplary array of touch nodes of a touch sensor panel, including grouping together qualifying edge touch nodes, according to examples of the disclosure.

Referring back to 610 in process 600, edge touch nodes meeting the one or more criteria to be identified as qualifying edge touch nodes can be grouped together into one or more groups (e.g., according to one or more grouping criteria). FIG. 10 illustrates an exemplary array 1000 of touch nodes of a touch sensor panel, including grouping together qualifying edge touch nodes, according to examples of the disclosure. FIG. 10 illustrates edge touch nodes in the first region meeting the one or more criteria to be identified as qualifying edge touch nodes. In some examples, a threshold number of consecutive qualifying edge touch nodes can be grouped together into a group (e.g., first grouping criterion). In some examples, the threshold number can be set at two edge touch nodes such that group 1008 can be identified as a first group and group 1002 can be identified as a second group, but singular edge touch nodes 1004 and 1010 can be excluded from grouping. In some examples, the threshold number can be greater or lower than two. For example, the threshold number can be set to three such that group 1002 can be identified as a first group, but two consecutive edge touch nodes 1008 and singular edge touch nodes 1004 and 1010 can be excluded from grouping.

Additionally, edge touch nodes wrapping around the corners can be grouped together into one group, rather than into two separate groups (e.g., one including two or more edge touch nodes along a first axis and the second including two or more edge touch nodes along a second axis). For example, four consecutive edge touch nodes wrapping around a corner can be grouped together into group 1006. These edge touch nodes likely meet the one or more criteria due to contact from one object. Grouping the corner edge touch nodes separately could result in mistakenly discarding the touch image at 525 (due to detecting more than the threshold number of groups).

As described above, in some examples, the one or more criteria for edge touch nodes to be identified as qualifying edge touch nodes can be relaxed. For example, when one or more edge touch nodes meeting the one or more criteria are separated by less than a threshold number of intervening edge touch nodes that fail to meet the one or more criteria, the one or more intervening edge touch nodes can be compared with a relaxed first signal threshold. When the one or more intervening edge touch nodes meet (are greater than or equal to) the relaxed first signal threshold, the one or more intervening edge touch nodes can be identified as potential edge touch nodes. In this way, the one or more edge touch nodes can be grouped together with the edge touch nodes meeting the one or more criteria into one group. For example, in FIG. 10, edge touch nodes in group 1008 and/or singular edge touch node 1010 may not meet (greater than or equal to) the threshold number of consecutive touch nodes alone, but when intervening edge touch node 1011 meets (greater than or equal to) the relaxed first touch signal threshold, group 1012 can be formed including three edge touch nodes meeting the one or more criteria and intervening edge touch node 1011 meeting the relaxed signal criteria. In some examples, the number of intervening edge touch nodes can be less than a threshold number of intervening edge touch nodes to be considered with the relaxed first signal threshold. In some examples, one intervening edge touch node can be considered with the relaxed first signal threshold. In some examples, the threshold number of intervening edge touch nodes can be greater such that two or more intervening edge touch nodes can be considered with the relaxed first signal threshold. Although described above as relaxing the first signal threshold to determine whether intervening edge touch nodes can be grouped together with edge touch nodes meeting the one or more criteria, in some examples, the first signal threshold for intervening edge touch nodes and/or the second signal threshold for reference touch nodes corresponding to the intervening touch nodes can be relaxed.

Figure 11:
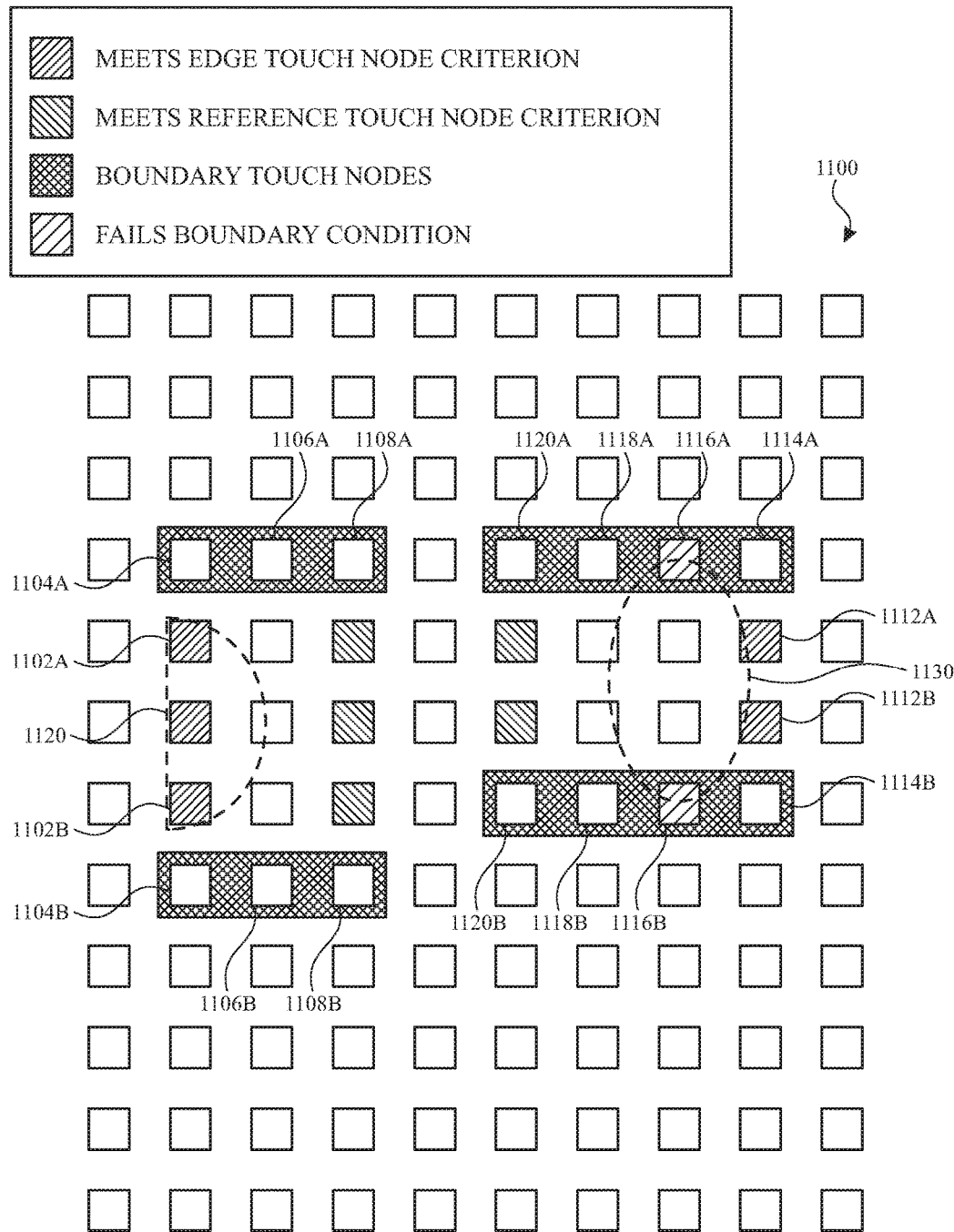
FIG. 11 illustrates an exemplary array of touch nodes of a touch sensor panel, including evaluating boundary conditions of one or more groups according to examples of the disclosure.

Referring back to 615 in process 600, the one or more groups of edge touch nodes can be evaluated for one or more boundary conditions. The evaluation of the boundary conditions can further assist in differentiating between unintended edge touches (e.g., from a straddling finger or palm) and intended touches near the edge of the touch sensor panel. The evaluation of boundary conditions can include evaluating signal levels for one or more touch nodes with a fixed relationship to a group of edge touch nodes meeting the one or more criteria. FIG. 11 illustrates an exemplary array 1100 of touch nodes of a touch sensor panel, including evaluating boundary conditions of one or more groups according to examples of the disclosure. In particular, FIG. 11 includes a representation of an unintended edge touch 1120 and an intended touch 1130 near an edge. One characteristic that distinguishes an unintended edge touch 1120 from and intended edge touch 1130 can be the shape of the input patch. Input patches from unintended edge touches may have a semicircle shape with a maximum diameter of the input patch at the edge touch nodes. Input patches from intended touches near an edge may have a circular shape with the maximum diameter of the input patch not at the edge touch nodes. For example, touch nodes of an unintended edge touch 1120 meeting (greater than or equal to) a threshold signal level can be confined to the rows of touch nodes defined by the edge touch nodes meeting the one or more criteria, whereas touch nodes of an intended touch 1130 near the edge meeting (greater than or equal to) the threshold signal level can be located outside of the rows of touch nodes defined by the edge touch nodes meeting the one or more criteria. Although both the unintended edge touch 1120 and intended touch 1130 near the edge are shown along the left or right side of array 1100, a group located along a top or bottom of array 1100 can include evaluation of boundary conditions using one or more column touch nodes (rather than row touch nodes) defining the boundary.

Evaluating the boundary conditions can include examining touch nodes along a boundary of a respective group. For example, FIG. 11 illustrates a group of continuous edge touch nodes from edge touch node 1102A to edge touch node 1102B can be formed as a first group of qualifying edge touch nodes. Touch nodes 1104A, 1106A and/or 1108A can be evaluated to determine whether their respective signal levels meet (greater than or equal to) a signal threshold (e.g., the first signal threshold). These touch nodes can correspond to the row of touch nodes adjacent to edge touch node 1102A and outside of the first group of edge touch nodes. Likewise, a row of touch nodes adjacent to edge touch node 1102B and outside of the first group (e.g., including touch nodes 1104B and/or 1108B) can be evaluated to determine whether their respective signal levels meet (greater than or equal to) a signal threshold (e.g., the first signal threshold). Although FIG. 11 includes three touch nodes on each side for which to evaluate the boundary conditions for the first group, in some examples the adjacent edge touch nodes 1104A and 1104B need not be reevaluated because their signal level may already have been evaluated against a signal threshold by earlier processing (e.g., at 605). Additionally, although FIG. 11 illustrates that touch nodes 1108A and 1108B may be included, in some examples the evaluation may only include one or more touch nodes in a row between the edge touch nodes and the reference touch nodes (e.g., touch nodes 1106A and 1106B).

Similarly, FIG. 11 illustrates a group of continuous edge touch nodes from edge touch node 1112A to edge touch node 1112B can be formed as a second group of qualifying edge touch nodes. Touch nodes 1114A, 1116A, 1118A and/or 1120A can be evaluated to determine whether their respective signal levels meet (greater than or equal to) a signal threshold (e.g., the first signal threshold). These touch nodes can correspond to the row of touch nodes adjacent to edge touch node 1112A and outside of the second group. Likewise, a row of touch nodes adjacent to edge touch node 1112B and outside of the second group (e.g., including touch nodes 1114B, 1116B, 1118B and 1120B can be evaluated to determine whether their respective signal levels meet (greater than or equal to) a signal threshold (e.g., the first signal threshold). As illustrated in FIG. 11, touch nodes 1116A and 1116B can meet (greater than or equal to) the signal threshold and thereby the second group can be identified as corresponding to an intended touch. Although FIG. 11 illustrates four touch nodes on each side for which to evaluate the boundary conditions for the second group, in some examples the adjacent edge touch nodes 1114A and 1114B need not be reevaluated because their signal level may already have been evaluated against a signal threshold by earlier processing (e.g., at 605). Additionally, although FIG. 11 illustrates that touch node 1120A and 1120B may be included, in some examples the evaluation may only include one or more touch nodes in a row between the edge touch nodes and the reference touch nodes (e.g., touch node 1116A, 1118A, 1116B and 1118B).

It should be understood that the processing of boundary conditions for a group can include evaluating both boundaries for each group. In some examples, when evaluation of both boundaries satisfy the boundary conditions indicative of an unintended edge touch, the group can be identified as a qualifying edge touch (e.g., at 620). In some examples, once evaluation of one boundary of a group fails to meet the boundary conditions, the processing at 615 can forgo evaluating the second boundary for the boundary conditions. In some examples, rather than requiring the evaluation of both boundaries to meet the boundary conditions indicative of an unintended edge touch, a group can be identified as a qualifying edge touch so long as the boundary conditions are met for at least one boundary. In such examples, the processing at 615 can forgo evaluating the second boundary for the boundary conditions when the first of the boundaries meets the boundary conditions. However, it should be understood that requiring both boundaries to meet the boundary conditions can prevent an intended edge touch from falsely inflating the number of qualifying edge touches and thereby improperly causing the discarding of a touch image at 525. Additionally, in some examples, requiring both boundaries to meet the boundary conditions can prevent the need for processing of the excluded region of the touch image at 730 after first processing the remaining touch image at 720 (e.g., when the number of qualifying edge touches is zero at 705).

As described above, a touch image may be discarded at 525 or processed at 530 depending on whether a threshold number of qualifying edge touches (e.g., groups of qualifying edge touch nodes meeting satisfying the one or more boundary conditions). In some examples, the threshold number can be set such that one group corresponding to a qualifying edge touch can be processed at 530, but more than one qualifying edge touch can result in the touch image being discarded. This threshold number can also be used at 610 and/or 615 to abort processing of groups of touch nodes (group formation and/or boundary condition evaluation) when this threshold number is met. For example, once a threshold number of groups are determined to be qualifying edge touches, the evaluation of boundary conditions and/or group processing can be terminated because the touch image will be discarded. This termination of group processing and/or evaluation of boundary conditions can result in reduced processing required before discarding a touch image such as the touch image illustrated in FIG. 4A.

Figure 12A:
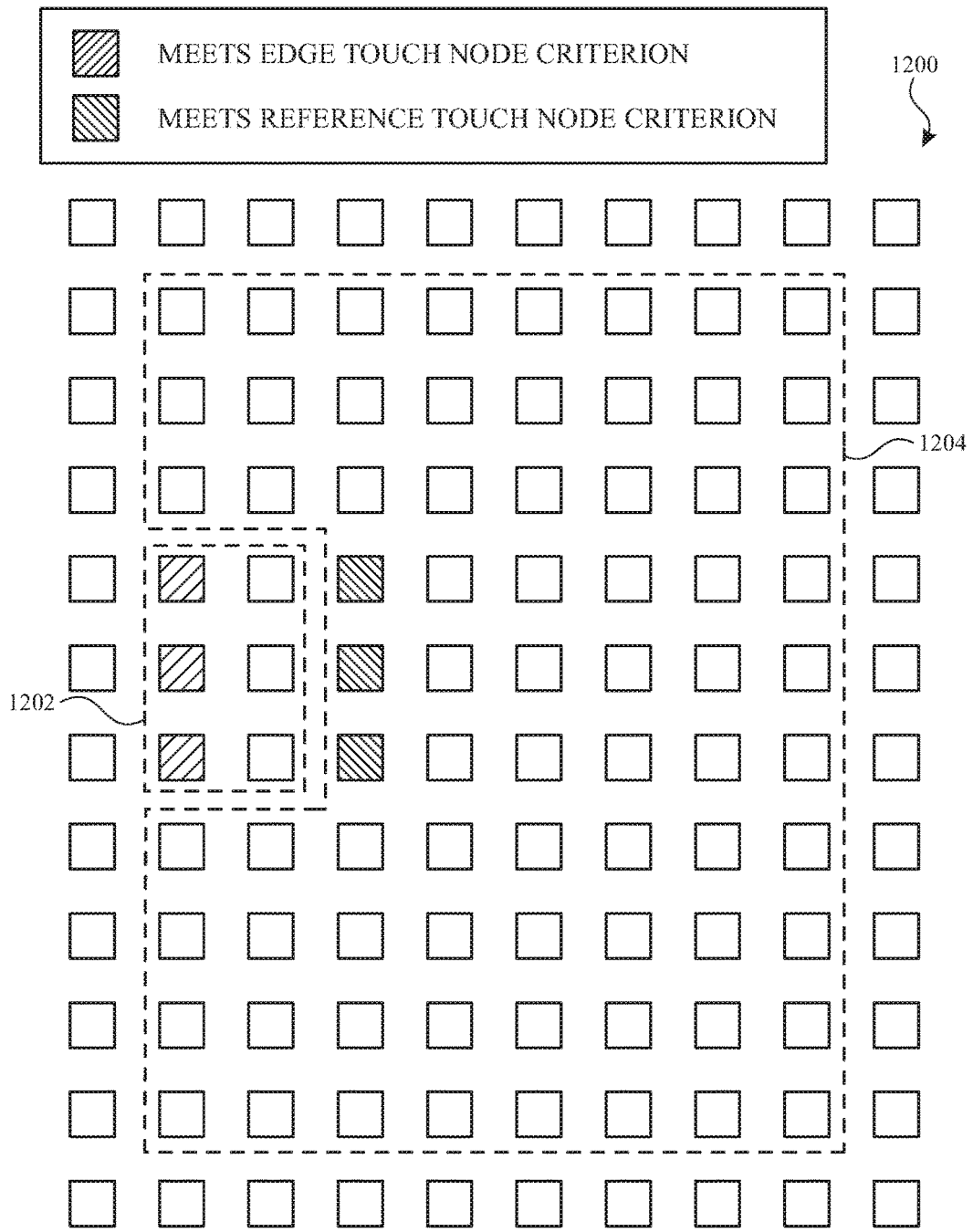
FIGS. 12A-12B illustrate exemplary exclusion regions for arrays of touch nodes according to examples of the disclosure.
Figure 12B:
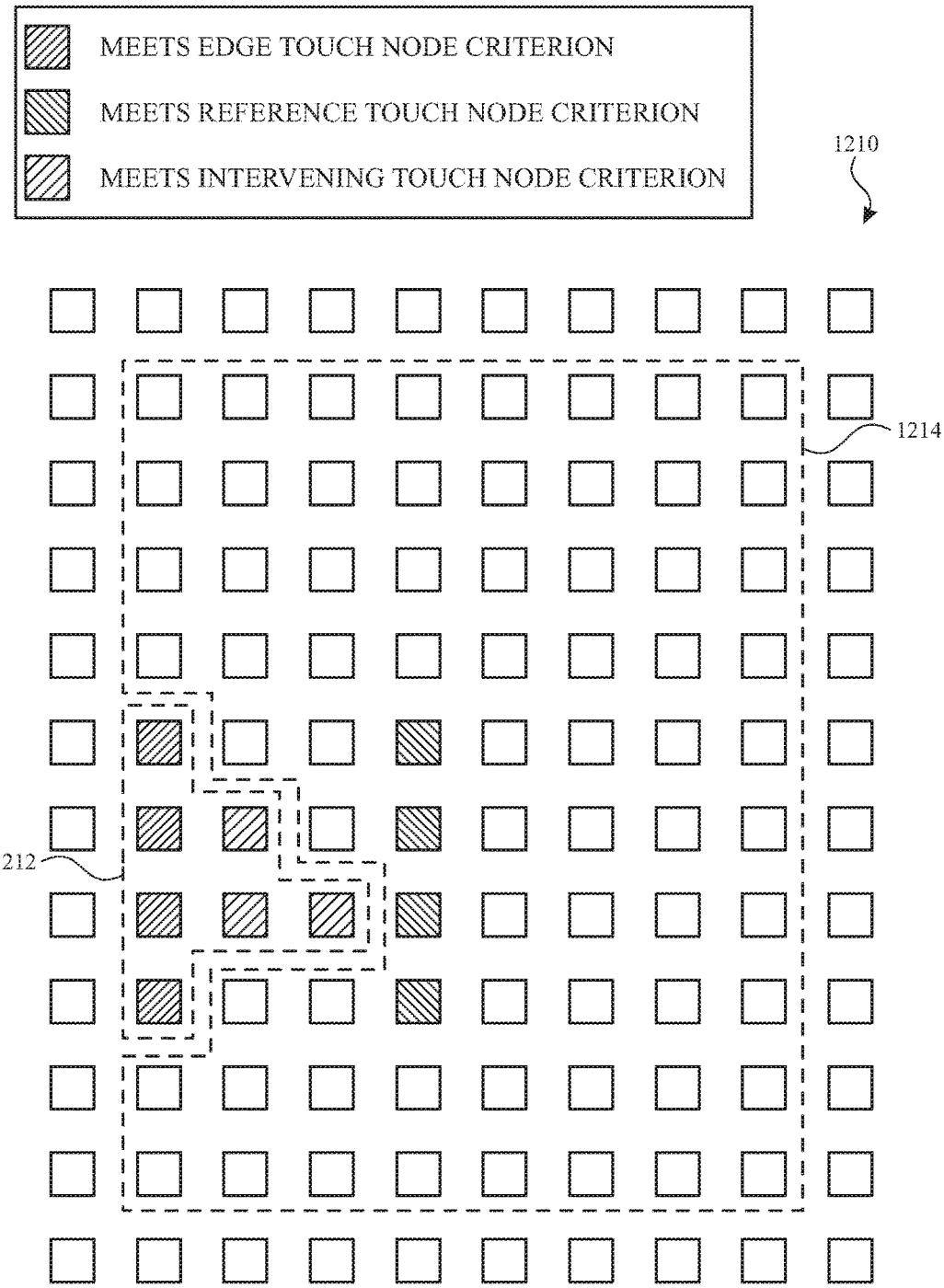

As described above, one or more regions of the touch image corresponding to the one or more qualifying edge touches can be excluded from the touch image at 715. In some examples, the exclusion region can be an arrangement of touch nodes with a linear shape (e.g., a rectangle) or non-linear shape. FIGS. 12A-12B illustrate exemplary exclusion regions for arrays of touch nodes according to examples of the disclosure. For example, FIG. 12A illustrates an array of touch nodes 1200 for which one group of three qualifying edge touch nodes satisfy the boundary conditions to be determined to be a qualifying edge touch. In some examples, the exclusion region 1202 can be defined having a linear, rectangular shape to include the qualifying edge touch. When applicable, the remaining region 1204 can be processed at 720 and/or the exclusion region 1202 can be processed at 730. Although exclusion region 1202 may be drawn to exclude the reference touch nodes in FIG. 12A, in some examples, the reference touch nodes corresponding to the qualifying edge touch nodes can be included in the exclusion region as well. Additionally or alternatively, the exclusion region can also be defined to add some margin. For example, a margin of one touch node can be added around the qualifying edge touch to expand the exclusion region 1202 from six touch nodes (2×3) to fifteen touch nodes (3×5).

In some examples, the region of the touch image to be excluded can be a non-linear shape. As described above with reference to FIG. 9B, in some examples, additional touch nodes between the qualifying edge touch nodes can be compared with the first signal threshold. This additional information can be used, in some examples, to generate an exclusion region with a tailored fit to the qualifying edge touch. For example, FIG. 12B illustrates an array of touch nodes 1210 for which one group of four qualifying edge touch nodes satisfies the boundary conditions to be determined to be a qualifying edge touch. Additionally, some of the touch nodes between the edge touch nodes and the corresponding reference touch nodes can also meet (be greater than or equal to) a signal threshold (e.g., the first signal threshold). The exclusion region 1212 can be defined having a non-linear shape to include unintended edge touch nodes meeting (greater than or equal to) the signal threshold, but excluding those touch nodes that do not (but would otherwise be included in a rectangular exclusion region such as the exclusion region illustrated in FIG. 12A). When applicable, the remaining region 1214 can be processed at 720 and/or the exclusion region 1212 can be processed at 730. Additionally or alternatively, the exclusion region can also be defined to add some margin. For example, a margin of one touch node can be added around the qualifying edge touch to expand exclusion region 1212 from seven touch nodes to nineteen touch nodes.

As described above, the touch parameters determined at 720 can be evaluated for a qualifying touch input at 725. A qualifying touch input can refer to an unsegmented touch input defining an input patch with parameters meeting one or more criteria. For example, the parameters can include, a centroid, one or more radii (e.g., maximum radius/minimum radius; x-axis radius/y-axis radius), a minimum intensity, a maximum intensity, a total intensity and/or a signal density.

In some examples, an input patch can be a qualifying touch when the signal density of the unsegmented input patch meets a signal density threshold (e.g., greater than or equal to a signal density threshold). In some examples, an input patch can be a qualifying touch when the radii of the unsegmented input patch meet radii thresholds (e.g., radii less than a radius threshold). In some examples, an input patch can be a qualifying touch when a centroid of the unsegment input patch is located in a pre-defined region. In some examples, one or more of the above conditions may need to be satisfied for the unsegmented input patch to be qualifying. For example, when the selected gesture is a single-finger tap gesture within a threshold distance from the center of a touch center panel, the unsegmented touch input may require a centroid within the threshold distance from the center, may require a radii less than a first radius threshold level (e.g., the first radius threshold level set such that touch input meeting this criterion can be indicative of a single finger, whereas multiple fingers may not meet this criterion), and may require a signal density meeting (greater than or equal to) a signal density threshold indicative of a touching object. Other gesture inputs may use fewer or more or different criteria to evaluate a qualifying touch. For example, a multi-finger gesture may have different radii constraints. For example, a qualifying touch input may be acceptable with a centroid anywhere on the touch sensor panel. For example, a qualifying touch input may be evaluated by the total signal intensity rather than a signal density.

As described above, the unsegmented touch input can be tracked over multiple acquired touch images, to detect a gesture at 535. For example, a path can track the input contact from an initial touchdown on the touch-sensitive surface through a liftoff from the touch-sensitive surface. The detection of a gesture can include intraframe information (e.g., centroid, radii, touch node intensity, etc.) and interframe information (e.g., duration, movement, etc.). Although FIG. 7 illustrates evaluating the intraframe unsegmented touch input from the remaining image without the exclusion region for a qualifying touch input at 725 (e.g., in order to trigger the processing for the exclusion region), it should be understood that to unsegmented touch input from 710 and 730 can also be evaluated in a similar manner to detect qualifying touch input satisfying the intraframe criteria (e.g., as part of 535).

Tracking of the unsegmented touch input patch can, for example, allow for determination of a duration of contact (e.g., the number of touch images/frames in which the unsegmented input patch is detected) and/or movement of a contact (e.g., based on the movement of the centroid of the unsegmented input patch). For example, when a desired input gesture is a tap gesture, the system may look for multiple frames where the unsegmented input patch meets one or more intraframe criteria in respective frames, such that the unsegmented touch input across these multiple frames satisfies a minimum duration (e.g., to distinguish from an accidental glancing touch) and a maximum displacement (e.g., to distinguish from a swiping finger). If the criteria are met, a qualifying tap gesture can be detected and can transition the system from a sleep state to an awake state. For example, the intraframe criteria for the tap gesture may include one or more location criteria, size criteria and/or signal density criteria as described above for a qualifying touch in a frame. The tap gesture may also include one or more additional interframe criteria such as requiring the duration of touchdown of the object be greater than a first threshold and less than a second threshold before liftoff and/or requiring less than a threshold amount of movement of the centroid. It should be understood that detection of other gestures (e.g., double tap, swipe, press and hold, multi-finger tap, etc.) may include different criteria. For example, detection of a swipe gesture may require some movement criteria be satisfied (e.g., greater than a minimum distance). A pinch gesture may require detection of a threshold change in radius (and may require different radii thresholds be applied for a qualifying touch within different frames).

Therefore, according to the above, some examples of the disclosure are directed to a method for touch detection in a low-power state. The method can comprise acquiring a touch image including measurements from a plurality of touch nodes of a touch-sensitive surface, processing the touch image to identify whether the touch image includes one or more qualifying edge touches, and in accordance with identifying a first qualifying edge touch: identifying a first portion of the touch image corresponding to the first qualifying edge touch, and processing a second portion of the touch image excluding the first portion of the touch image to identify a touch input for the touch image without segmenting the second portion of the touch image. Additionally or alternatively to one or more of the examples disclosed above, in some examples, the method can further comprise: in accordance with identifying the first qualifying edge touch and one or more additional qualifying edge touches greater than or equal to a threshold number of qualifying edge touches, forgoing further processing of the touch image. Additionally or alternatively to one or more of the examples disclosed above, in some examples, the method can further comprise: in accordance with identifying no qualifying edge touch, processing the touch image to determine the touch input for the touch image without segmenting the touch image. Additionally or alternatively to one or more of the examples disclosed above, in some examples, the method can further comprise: in accordance with a determination that the touch input for the touch image meets one or more qualifying criteria, processing the touch input for the touch image and touch inputs from additional touch images to detect a specified gesture when one or more gesture criteria are met. Additionally or alternatively to one or more of the examples disclosed above, in some examples, the method can further comprise: in accordance with detecting the specified gesture, performing an action associated with the specified gesture; and in accordance with not detecting the specified gestured, forgoing performing the action associated with the specified gesture. Additionally or alternatively to one or more of the examples disclosed above, in some examples, the specified gesture can be a tap gesture. Additionally or alternatively to one or more of the examples disclosed above, in some examples, the action associated with the specified gesture can be a transition between the low-power state and an active state. Additionally or alternatively to one or more of the examples disclosed above, in some examples, the method can further comprise: in accordance with a determination the touch input identified from processing the second portion of the touch image excluding the first portion of the touch image does not meet the one or more qualifying criteria, processing the first portion of the touch image excluding the second portion to re-identify the touch input for the touch image without segmenting the first portion of the touch image. Additionally or alternatively to one or more of the examples disclosed above, in some examples, the method can further comprise: baselining the touch image with a baseline image. The baseline image can correspond to a previously acquired touch image without a qualifying touch input. Additionally or alternatively to one or more of the examples disclosed above, in some examples, the baseline image can include a plurality of qualifying edge touches of the previously acquired touch image, such that baselining filters out the plurality of qualifying edge touches. Additionally or alternatively to one or more of the examples disclosed above, in some examples, processing the touch image to identify whether the touch image includes the one or more qualifying edge touches can comprise: identifying one or more qualifying edge touch nodes in a first region meeting signal criteria including a first signal criterion that a respective edge touch node is greater than or equal to a first signal threshold and a second signal criterion that a respective reference touch corresponding to the respective edge touch nodes is less than a second signal threshold. Additionally or alternatively to one or more of the examples disclosed above, in some examples, processing the touch image to identify whether the touch image includes the one or more qualifying edge touches can further comprises: grouping the one or more qualifying edge touch nodes into one or more groups. Each group can include a threshold number of contiguous qualifying edge touch nodes. Additionally or alternatively to one or more of the examples disclosed above, in some examples, processing the touch image to identify whether the touch image includes the one or more qualifying edge touches further comprises: evaluating one or more boundary conditions for the one or more groups. A group of the one or more groups meeting the one or more boundary conditions can be identified as a qualifying edge touch.

Some examples of the disclosure are directed to a non-transitory computer readable storage medium. A non-transitory computer readable storage medium can store instructions, which when executed by one or more processors, cause the one or more processors to perform any of the above methods. Some examples of the disclosure are directed to an electronic device. The electronic device can comprise a touch-sensitive surface and one or more processors capable of performing any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method for touch detection in a low-power state comprising:
acquiring a touch image including measurements from a plurality of touch nodes of a touch-sensitive surface;
processing the touch image to identify whether the touch image includes one or more qualifying edge touches; and
in accordance with identifying a first qualifying edge touch:
identifying a first portion of the touch image corresponding to the first qualifying edge touch; and
processing a second portion of the touch image excluding the first portion of the touch image to identify a touch input for the touch image without segmenting the second portion of the touch image.

2. The method of claim 1, further comprising:
in accordance with identifying the first qualifying edge touch and one or more additional qualifying edge touches greater than or equal to a threshold number of qualifying edge touches:
forgoing further processing of the touch image.

3. The method of claim 1, further comprising:
in accordance with identifying no qualifying edge touch:
processing the touch image to determine the touch input for the touch image without segmenting the touch image.

4. The method of claim 1, further comprising:
in accordance with a determination that the touch input for the touch image meets one or more qualifying criteria, processing the touch input for the touch image and touch inputs from additional touch images to detect a specified gesture when one or more gesture criteria are met;
in accordance with detecting the specified gesture, performing an action associated with the specified gesture; and
in accordance with not detecting the specified gestured, forgoing performing the action associated with the specified gesture.

5. The method of claim 4, wherein the specified gesture is a tap gesture.

6. The method of claim 4, where the action associated with the specified gesture is a transition between the low-power state and an active state.

7. The method of claim 1, further comprising:
in accordance with a determination the touch input identified from processing the second portion of the touch image excluding the first portion of the touch image does not meet the one or more qualifying criteria, processing the first portion of the touch image excluding the second portion to re-identify the touch input for the touch image without segmenting the first portion of the touch image.

8. The method of claim 1, further comprising:
baselining the touch image with a baseline image; wherein the baseline image corresponds to a previously acquired touch image without a qualifying touch input.

9. The method of claim 8, wherein the baseline image includes a plurality of qualifying edge touches of the previously acquired touch image, such that baselining filters out the plurality of qualifying edge touches.

10. The method of claim 1, wherein processing the touch image to identify whether the touch image includes the one or more qualifying edge touches comprises:
identifying one or more qualifying edge touch nodes in a first region meeting signal criteria including a first signal criterion that a respective edge touch node is greater than or equal to a first signal threshold and a second signal criterion that a respective reference touch corresponding to the respective edge touch nodes is less than a second signal threshold.

11. The method of claim 10, wherein processing the touch image to identify whether the touch image includes the one or more qualifying edge touches further comprises:
grouping the one or more qualifying edge touch nodes into one or more groups, wherein each group includes a threshold number of contiguous qualifying edge touch nodes.

12. The method of claim 11, wherein processing the touch image to identify whether the touch image includes the one or more qualifying edge touches further comprises:
evaluating one or more boundary conditions for the one or more groups, wherein a group of the one or more groups meeting the one or more boundary conditions is identified as a qualifying edge touch.

13. An electronic device comprising:
a touch-sensitive surface; and
one or more processors coupled to the touch-sensitive surface configured for:
acquiring a touch image including measurements from a plurality of touch nodes of the touch-sensitive surface;
processing the touch image to identify whether the touch image includes one or more qualifying edge touches; and
in accordance with identifying a first qualifying edge touch:
identifying a first portion of the touch image corresponding to the first qualifying edge touch; and
processing a second portion of the touch image excluding the first portion of the touch image to identify a touch input for the touch image without segmenting the second portion of the touch image.

14. The electronic device of claim 13, one or more processors further configured for:
in accordance with identifying the first qualifying edge touch and one or more additional qualifying edge touches greater than or equal to a threshold number of qualifying edge touches:
forgoing further processing of the touch image.

15. The electronic device of claim 13, one or more processors further configured for:
in accordance with a determination that the touch input for the touch image meets one or more qualifying criteria, processing the touch input for the touch image and touch inputs from additional touch images to detect a specified gesture when one or more gesture criteria are met;
in accordance with detecting the specified gesture, performing an action associated with the specified gesture; and
in accordance with not detecting the specified gestured, forgoing performing the action associated with the specified gesture.

16. The electronic device of claim 13, one or more processors further configured for:
in accordance with a determination the touch input identified from processing the second portion of the touch image excluding the first portion of the touch image does not meet the one or more qualifying criteria, processing the first portion of the touch image excluding the second portion to re-identify the touch input for the touch image without segmenting the first portion of the touch image.

17. The electronic device of claim 16, wherein the specified gesture is a tap gesture.

18. The electronic device of claim 16, where the action associated with the specified gesture is a transition between the low-power state and an active state.

19. The electronic device of claim 13, wherein processing the touch image to identify whether the touch image includes the one or more qualifying edge touches comprises:
identifying one or more qualifying edge touch nodes in a first region meeting signal criteria including a first signal criterion that a respective edge touch node is greater than or equal to a first signal threshold and a second signal criterion that a respective reference touch corresponding to the respective edge touch nodes is less than a second signal threshold.

20. The electronic device of claim 19, wherein processing the touch image to identify whether the touch image includes the one or more qualifying edge touches further comprises:
grouping the one or more qualifying edge touch nodes into one or more groups, wherein each group includes a threshold number of contiguous qualifying edge touch nodes.

21. The electronic device of claim 20, wherein processing the touch image to identify whether the touch image includes the one or more qualifying edge touches further comprises:
evaluating one or more boundary conditions for the one or more groups, wherein a group of the one or more groups meeting the one or more boundary conditions is identified as a qualifying edge touch.

22. The electronic device of claim 13, the one or more processors further configured for:
in accordance with identifying no qualifying edge touch:
processing the touch image to determine the touch input for the touch image without segmenting the touch image.

23. The electronic device of claim 13, the one or more processors further configured for:
baselining the touch image with a baseline image; wherein the baseline image corresponds to a previously acquired touch image without a qualifying touch input.

24. The electronic device of claim 23, wherein the baseline image includes a plurality of qualifying edge touches of the previously acquired touch image, such that baselining filters out the plurality of qualifying edge touches.

25. A non-transitory computer readable storage medium storing instructions, which when executed by one or more processors, cause the one or more processors to perform a method, the method comprising:
acquiring a touch image including measurements from a plurality of touch nodes of a touch-sensitive surface;
processing the touch image to identify whether the touch image includes one or more qualifying edge touches; and
in accordance with identifying a first qualifying edge touch:
identifying a first portion of the touch image corresponding to the first qualifying edge touch; and
processing a second portion of the touch image excluding the first portion of the touch image to identify a touch input for the touch image without segmenting the second portion of the touch image.

26. The non-transitory computer readable storage medium of claim 25, the method further comprising:
in accordance with identifying the first qualifying edge touch and one or more additional qualifying edge touches greater than or equal to a threshold number of qualifying edge touches:
forgoing further processing of the touch image.

27. The non-transitory computer readable storage medium of claim 25, the method further comprising:
in accordance with identifying no qualifying edge touch:
processing the touch image to determine the touch input for the touch image without segmenting the touch image.

28. The non-transitory computer readable storage medium of claim 25, the method further comprising:
in accordance with a determination that the touch input for the touch image meets one or more qualifying criteria, processing the touch input for the touch image and touch inputs from additional touch images to detect a specified gesture when one or more gesture criteria are met;

in accordance with detecting the specified gesture, performing an action associated with the specified gesture; and in accordance with not detecting the specified gestured, forgoing performing the action associated with the specified gesture.

29. The non-transitory computer readable storage medium of claim 28, wherein the specified gesture is a tap gesture.

30. The non-transitory computer readable storage medium of claim 28, where the action associated with the specified gesture is a transition between the low-power state and an active state.

31. The non-transitory computer readable storage medium of claim 25, the method further comprising:

in accordance with a determination the touch input identified from processing the second portion of the touch image excluding the first portion of the touch image does not meet the one or more qualifying criteria, processing the first portion of the touch image excluding the second portion to re-identify the touch input for the touch image without segmenting the first portion of the touch image.

32. The non-transitory computer readable storage medium of claim 25, the method further comprising:

baselining the touch image with a baseline image; wherein the baseline image corresponds to a previously acquired touch image without a qualifying touch input.

33. The non-transitory computer readable storage medium of claim 27, wherein the baseline image includes a plurality of qualifying edge touches of the previously acquired touch image, such that baselining filters out the plurality of qualifying edge touches.

34. The non-transitory computer readable storage medium of claim 25, wherein processing the touch image to identify whether the touch image includes the one or more qualifying edge touches comprises:

identifying one or more qualifying edge touch nodes in a first region meeting signal criteria including a first signal criterion that a respective edge touch node is greater than or equal to a first signal threshold and a second signal criterion that a respective reference touch corresponding to the respective edge touch nodes is less than a second signal threshold.

35. The non-transitory computer readable storage medium of claim 34, wherein processing the touch image to identify whether the touch image includes the one or more qualifying edge touches further comprises:

grouping the one or more qualifying edge touch nodes into one or more groups, wherein each group includes a threshold number of contiguous qualifying edge touch nodes.

36. The non-transitory computer readable storage medium of claim 35, wherein processing the touch image to identify whether the touch image includes the one or more qualifying edge touches further comprises:

evaluating one or more boundary conditions for the one or more groups, wherein a group of the one or more groups meeting the one or more boundary conditions is identified as a qualifying edge touch.

* * * * *

UNITED STATES PATENT AND TRADEMARK OFFICE
CERTIFICATE OF CORRECTION

PATENT NO. : 10,444,820 B2
APPLICATION NO. : 15/701223
DATED : October 15, 2019
INVENTOR(S) : Zhao Liu et al.

Page 1 of 1

It is certified that error appears in the above-identified patent and that said Letters Patent is hereby corrected as shown below:

In the Claims

In Column 27, Line 32, in Claim 33, delete "claim 27," and insert -- claim 32, --.

Signed and Sealed this
Seventh Day of April, 2020

Andrei Iancu
*Director of the United States Patent and Trademark Office*